United States Patent
Nogami et al.

(10) Patent No.: US 10,085,158 B2
(45) Date of Patent: Sep. 25, 2018

(54) USER EQUIPMENTS, BASE STATIONS AND METHODS

(71) Applicant: Sharp Laboratories of America, Inc., Camas, WA (US)

(72) Inventors: Toshizo Nogami, Vancouver, WA (US); Zhanping Yin, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 87 days.

(21) Appl. No.: 15/152,923

(22) Filed: May 12, 2016

(65) Prior Publication Data

US 2016/0337880 A1 Nov. 17, 2016

Related U.S. Application Data

(60) Provisional application No. 62/161,845, filed on May 14, 2015.

(51) Int. Cl.
| | |
|---|---|
| *H04W 4/00* | (2018.01) |
| *H04W 24/02* | (2009.01) |
| *H04W 72/04* | (2009.01) |
| *H04L 5/00* | (2006.01) |

(52) U.S. Cl.
CPC .......... *H04W 24/02* (2013.01); *H04L 5/0048* (2013.01); *H04L 5/0053* (2013.01); *H04W 72/042* (2013.01); *H04W 72/044* (2013.01)

(58) Field of Classification Search
CPC .......... H04W 52/146; H04W 72/0413; H04W 72/082; H04W 52/228; H04W 72/042; H04W 72/0426; H04W 72/0473; H04W 72/1289; H04W 88/04; H04W 88/08; H04W 52/325; H04W 72/00; H04W 72/04; H04W 72/085; H04W 92/20
See application file for complete search history.

(56) References Cited

U.S. PATENT DOCUMENTS

| | | |
|---|---|---|
| 2013/0010668 A1 | 1/2013 | Lin et al. |
| 2013/0194931 A1* | 8/2013 | Lee ........................ H04L 5/0053 370/241 |

(Continued)

FOREIGN PATENT DOCUMENTS

WO 2013119060 A1 8/2013

OTHER PUBLICATIONS

Search Report and Written Opinion issued for International Application No. PCT/US2016/032493 dated Aug. 8, 2016.

(Continued)

*Primary Examiner* — Kan Yuen
(74) *Attorney, Agent, or Firm* — Austin Rapp

(57) ABSTRACT

A user equipment (UE) is described. The UE includes a higher layer processor configured to receive an RRC message for enhanced resource element group (EREG) configuration. The UE also includes a physical downlink control channel receiver configured to monitor an enhanced physical downlink control channel (EPDCCH) on the basis of a first EREG structure if the EREG configuration is not established, and to monitor the EPDCCH on the basis of a second EREG structure if the EREG configuration is established. All resource elements (REs) with number i in a physical resource block (PRB) pair comprise EREG number i.

8 Claims, 24 Drawing Sheets

(56) References Cited

U.S. PATENT DOCUMENTS

| | | |
|---|---|---|
| 2013/0272262 A1 | 10/2013 | Li et al. |
| 2013/0315114 A1 | 11/2013 | Seo et al. |
| 2013/0322343 A1 | 12/2013 | Seo et al. |
| 2014/0003387 A1 | 1/2014 | Lee et al. |
| 2014/0029561 A1 | 1/2014 | Kim et al. |
| 2014/0044105 A1 | 2/2014 | Bontu et al. |
| 2014/0050206 A1 | 2/2014 | Seo et al. |
| 2014/0064237 A1 | 3/2014 | Lee et al. |
| 2014/0112277 A1 | 4/2014 | Yang et al. |
| 2014/0112280 A1 | 4/2014 | Lee et al. |
| 2014/0161002 A1 | 6/2014 | Gauvreau et al. |
| 2014/0177527 A1 | 6/2014 | Lee et al. |
| 2014/0185539 A1 | 7/2014 | Seo et al. |
| 2014/0204854 A1 | 7/2014 | Freda et al. |
| 2014/0334395 A1 | 11/2014 | Lee et al. |
| 2014/0376395 A1* | 12/2014 | Kim .................. H04L 5/001 370/252 |
| 2016/0278054 A1* | 9/2016 | You .................. H04L 5/0053 |

OTHER PUBLICATIONS

Ericsson, "Initial Discussion on Solutions for Identified LAA Functionalities," 3GPP TSGP RAN WG1 Meeting #78bis, R1-144267, Oct. 6, 2014.

Nokia Networks, Nokia Corporation, "Short Control Signalling for LTE LAA," 3GPP TSG-RAN WG1 Meeting #78bis, R1-144186, Oct. 6, 2014.

Nokia Networks, Nokia Corporation, "Listen Before Talk and Channel Access," 3GPP TSG RAN W1 Meeting #78bis, R1-144187, Oct. 6, 2014.

Huawei, HiSilicon, "Potential Solutions for LAA-LTE Design," 3GPP TSG RAN WG1 Meeting #78bis, R1-143726, Oct. 6, 2014.

Samsung, "Discussion on Solutions for Required Functionalities and Design Targets for LAA," 3GPP TSG RAN WG1 #78bis, R1-143879, Oct. 6, 2014.

Motorola Mobility, "Physical Layer Options for LAA-LTE," 3GPP TSG RAN WG1 #78bis, R1-144236, Oct. 6, 2014.

3GPP TS 36.331, version 12.7.0, Evolved Universal Terrestrial Radio Access (E-UTRA); Radio Resource Control (RRC); Protocol specification (Release 12), Sep. 2015.

3GPP TS 36.213 V12.4.0, "Evolved Universal Terrestrial Radio Access (E-UTRA); Physical Layer Procedures (Release 12)," Dec. 2014.

3GPP TS 36.211. v12.7.0, Evolved Universal Terrestrial Radio Access (E-UTRA); Physical channels and modulation (Release 12); Sep. 2015.

* cited by examiner

US 10,085,158 B2

USER EQUIPMENTS, BASE STATIONS AND METHODS

RELATED APPLICATIONS

This application is related to and claims priority from U.S. Provisional Patent Application No. 62/161,845, entitled "USER EQUIPMENTS, BASE STATIONS AND METHODS," filed on May 14, 2015, which is hereby incorporated by reference herein, in its entirety.

TECHNICAL FIELD

The present disclosure relates generally to communication systems. More specifically, the present disclosure relates to user equipments (UEs), base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
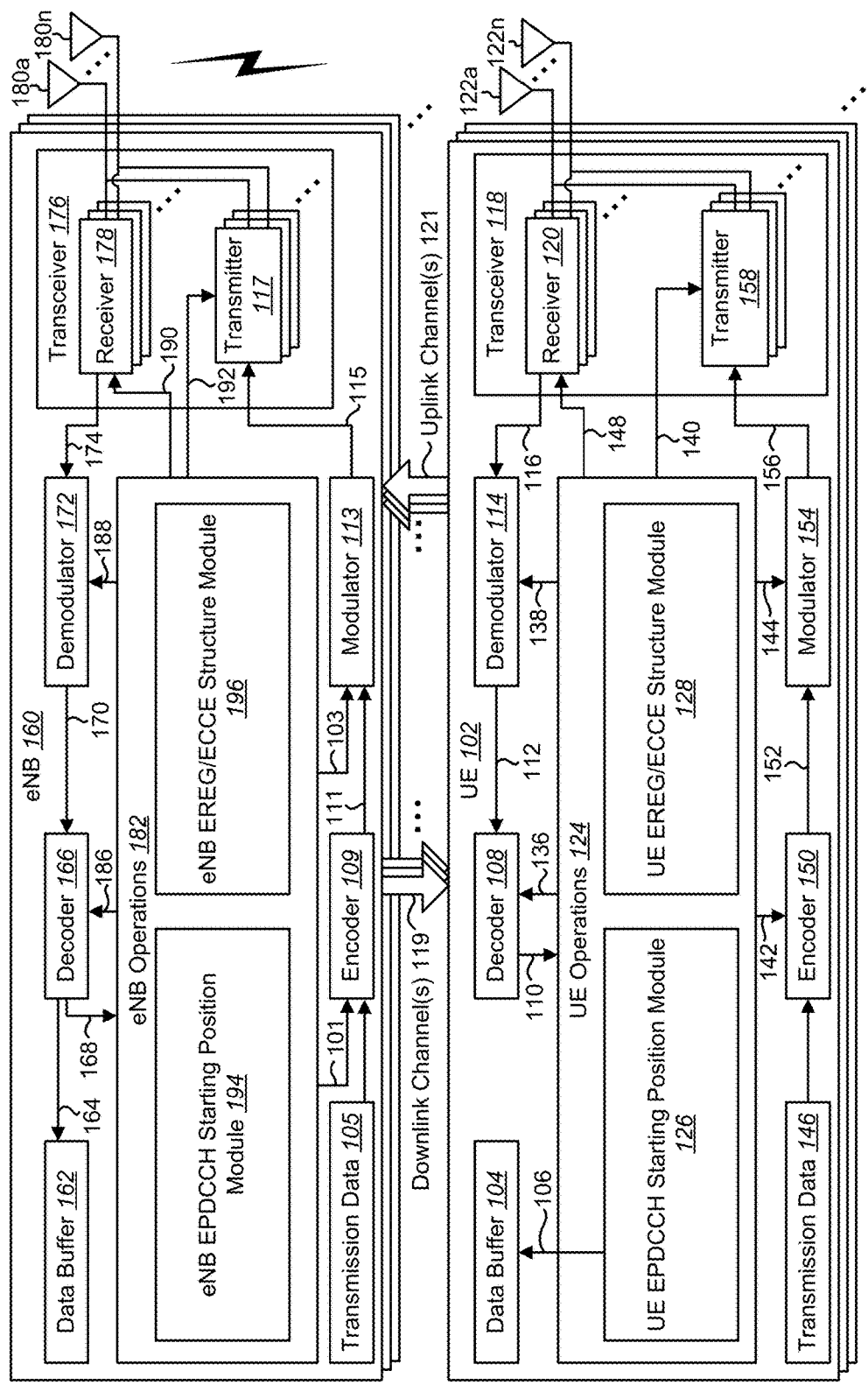
FIG. 1 is a block diagram illustrating one implementation of one or more evolved NodeBs (eNBs) and one or more user equipments (UEs) in which systems and methods for licensed assisted access (LAA) may be implemented.

A user equipment (UE) is described. The UE includes a higher layer processor configured to receive an RRC message for enhanced resource element group (EREG) configuration. The UE also includes a physical downlink control channel receiver configured to monitor an enhanced physical downlink control channel (EPDCCH) on the basis of a first EREG structure if the EREG configuration is not established, and to monitor the EPDCCH on the basis of a second EREG structure if the EREG configuration is established. All resource elements (REs) with number i in a physical resource block (PRB) pair comprise EREG number i.

In the first EREG structure, the EREG number i may be based on numbering all resource elements, except for resource elements carrying demodulation reference signal (DM-RS), in the PRB pair cyclically from an index set in an increasing order of first frequency and then time. In the second EREG structure, the EREG number i may be based on numbering all resource elements, except for resource elements carrying demodulation reference signal (DM-RS), on a set of consecutive OFDM symbols within the PRB pair cyclically from a subset of the index set in an increasing order of first frequency and then time.

A single subframe may include a first slot and a second slot in time domain. In the first EREG structure, each EREG may include both REs belonging to the first slot and REs belonging to the second slot. In the second EREG structure, each EREG may include either the REs belonging to the first slot or the REs belonging to the second slot.

A single enhanced control channel element (ECCE) may include a plurality of EREGs that have REs belonging to the same set of consecutive OFDM symbols within the PRB pair. The EPDCCH may include a plurality of ECCEs that have REs belonging to the same set of consecutive OFDM symbols within the PRB pair.

An evolved NodeB (eNB) is also described. The eNB includes a higher layer processor configured to send an RRC message for EREG configuration. The eNB also includes a physical downlink control channel transmitter configured to transmit an EPDCCH on the basis of a first EREG structure if the EREG configuration is not established, and to transmit the EPDCCH on the basis of a second EREG structure if the EREG configuration is established. All REs with number i in a PRB pair comprise EREG number i.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation. Carrier aggregation refers to the concurrent utilization of more than one carrier. In carrier aggregation, more than one cell may be aggregated to a UE. In one example, carrier aggregation may be used to increase the effective bandwidth available to a UE. The same TDD uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

Licensed-assisted access (LAA) may support LTE in unlicensed spectrum. In a LAA network, the DL transmission may be scheduled in an opportunistic manner. For fairness utilization, an LAA eNB may perform functions such as clear channel assessment (CCA), listen before talk (LBT) and dynamic frequency selection (DFS) before transmission. When the eNB performs LBT, the eNB cannot transmit any signals including reference signals.

Due to LBT, the eNB may not know whether it is allowed to transmit a physical downlink shared channel (PDSCH). On the other hand, for the same subframe, the eNB may know that it is allowed to transmit some signal in another carrier, which may carry control channel associated with the PDSCH.

The described systems and methods provide for transmitting the control channel in an LAA network. In a scheduling cell (e.g. a cell in licensed carrier or another LAA secondary cell (SCell)) of an LAA SCell, the control channel (e.g., PDCCH/EPDCCH) may be mapped on the latter part of the subframe in which LBT is performed on the LAA SCell.

The eNB may start to map the associated (E)PDCCH on the scheduling cell (e.g., serving cell 1) in a subframe after ensuring CCA on the LAA SCell (e.g., serving cell 2) in the same subframe. The UE may attempt blind detections of the associated (E)PDCCH on the serving cell 1 for PDSCH transmission on the serving cell 2, assuming (E)PDCCH is mapped only on the latter part of the subframe.

The eNB may start to map the (E)PDCCH, which is associated with PDSCH of the serving cell 1, on the serving cell 1 at a normal position. The UE may attempt blind detections of the (E)PDCCH, which is associated with PDSCH of the serving cell 1, on the serving cell 1 under the assumption that the (E)PDCCH is mapped based on the normal position.

It should be noted that the normal position may be based on control format information (CFI) carried by the physical control format indicator channel (PCFICH). Alternatively, it may be configured by higher layer signaling (e.g. by the value in RRC message, such as epdcch-StartSymbol-r11 and pdsch-Start-r11, where epdcch-StartSymbol-r11 is a value indicating a semi-static starting position of EPDCCH and pdsch-Start-r11 is a value indicating a candidate starting position of PDSCH).

If the UE is configured with CIF and the DCI format size is the same, the eNB may map the (E)PDCCH associated with PDSCH of the serving cell 1 on the same search space as that for the (E)PDCCH associated with PDSCH of the serving cell 2. If the UE is configured with CIF and the DCI format size is the same, the UE may attempt blind detections of the (E)PDCCH associated with PDSCH of the serving cell 1 on the same search space as that for the (E)PDCCH associated with PDSCH of the serving cell 2.

If the UE is configured with CIF and the DCI format size is the same, and if the serving cell 2 is an LAA SCell, the eNB may not map the (E)PDCCH associated with PDSCH of the serving cell 1 on the same search space as that for the (E)PDCCH associated with PDSCH of the serving cell 2. If the UE is configured with CIF and the DCI format size is the same, and if the serving cell 2 is an LAA SCell, the UE may not attempt blind detections of the (E)PDCCH associated with PDSCH of the serving cell 1, on the same search space as that for the (E)PDCCH associated with PDSCH of the serving cell 2.

If the UE is configured with CIF and the DCI format size is the same, and if the serving cell 2 is an LAA SCell, the eNB may not map the (E)PDCCH associated with PDSCH of the serving cell 2 on the same search space as that for the (E)PDCCH associated with PDSCH of the serving cell 1. If the UE is configured with CIF and the DCI format size is the same, and if the serving cell 2 is an LAA SCell, the UE may not attempt blind detections of the (E)PDCCH associated with PDSCH of the serving cell 2 on the same search space as that for the (E)PDCCH associated with PDSCH of the serving cell 1.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for LAA may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE EPDCCH starting position module 126 and a UE EREG/ECCE structure module 128.

A UE 102 may be configured with self-scheduling or cross-carrier scheduling. If the UE 12 is not configured with cross-carrier scheduling or if the UE 102 is not configured with a carrier indicator field (CIF), then the physical downlink control channel (PDCCH) or enhanced physical downlink control channel (EPDCCH) of a serving cell may schedule resources on that serving cell. An example of self-scheduling is described in connection with FIG. 5.

Cross-carrier scheduling with the CIF may allow the (E)PDCCH of a serving cell to schedule resources on another serving cell. An example of cross-carrier scheduling is described in connection with FIG. 6.

For cross-carrier scheduling among licensed carriers, the following restrictions may be adopted. Cross-carrier scheduling may not apply to the primary cell (PCell). The PCell may be scheduled via its (E)PDCCH. When the (E)PDCCH of a secondary cell (SCell) is configured, cross-carrier scheduling may not apply to this SCell. In this case, the SCell may be scheduled via its (E)PDCCH. When the (E)PDCCH of an SCell is not configured, cross-carrier scheduling applies and this SCell is always scheduled via the (E)PDCCH of one other serving cell.

A linking between uplink (UL) and downlink (DL) may allow identifying the serving cell for which the DL assignment or UL grant applies when the CIF is not present. A DL assignment received on a PCell may correspond to downlink transmission on the PCell. An UL grant received on a PCell may correspond to uplink transmission on the PCell. A DL assignment received on SCell n may correspond to downlink transmission on SCell n. An UL grant received on SCell n may correspond to uplink transmission on SCell n. If SCell n is not configured for uplink usage by the UE 102, then the grant may be ignored by the UE 102.

When Dual Connectivity (DC) is configured, cross-carrier scheduling can be used across serving cells within the same cell group (CG). Within a CG, neither the PCell of the MCG nor the primary secondary cell (PSCell) of the SCG can be cross-carrier scheduled.

A UE 102 configured with the CIF for a given serving cell may assume that the CIF is not present in any PDCCH of the serving cell in the common search space, which is defined in PCell or pSCell. Otherwise, the configured UE 102 may assume that for the given serving cell, the CIF is present in the PDCCH/EPDCCH located in the UE-specific search space when the PDCCH/EPDCCH cyclic redundancy check (CRC) is scrambled by C-RNTI or SPS C-RNTI.

The CIF presence on a given serving cell and the cross-carrier scheduling for the serving cell may be independently configured. The information element (IE) CrossCarrier-SchedulingConfig may be used to specify the configuration when the cross-carrier scheduling is used in a cell. Listing (1) illustrates an example of the CrossCarrierScheduling-Config information element.

In Listing (1), the field cif-Presence is a field used to indicate whether carrier indicator field is present (value TRUE) or not (value FALSE) in PDCCH/EPDCCH downlink control information (DCI) formats.

The field pdsch-Start is the starting OFDM symbol of PDSCH for the concerned SCell. Values 1, 2, 3 are applicable when dl-Bandwidth for the concerned SCell is greater than 10 resource blocks. Values 2, 3, 4 are applicable when dl-Bandwidth for the concerned SCell is less than or equal to 10 resource blocks.

The field schedulingCellId indicates which cell signals the downlink allocations and uplink grants, if applicable, for the concerned SCell. In the case where the UE 102 is configured with DC, the scheduling cell is part of the same cell group (i.e., master cell group (MCG) or secondary cell group (SCG)) as the scheduled cell.

The set of PDCCH candidates to monitor may be defined in terms of search spaces. The UE 102 may monitor a set of EPDCCH candidates on one or more activated serving cells as configured by higher layer signaling for control information. In this case, monitoring implies attempting to decode each of the EPDCCHs in the set according to the monitored DCI formats. The set of EPDCCH candidates to monitor may be defined in terms of EPDCCH UE-specific search spaces.

A UE 102 may be configured to monitor EPDCCH candidates in a given serving cell with a given DCI format size with CIF, and CRC scrambled by C-RNTI. When the EPDCCH candidates have one or more possible values of CIF for the given DCI format size, the UE 102 may assume that an EPDCCH candidate with the given DCI format size is transmitted in the given serving cell in any EPDCCH UE-specific search space corresponding to any of the possible values of CIF for the given DCI format size.

A UE EPDCCH starting position module 126 may determine the starting position for monitoring EPDCCH. For EPDCCH scheduling a normal cell's PDSCH, the EPDCCH starting position on the serving cell may be described as the following regardless of whether the EPDCCH schedules the serving cell's resources or another serving cell's resources. EPDCCH may be mapped to a set of downlink resource elements. Each downlink resource element may be indexed as (k,l) in a physical resource-block (PRB) pair configured for possible EPDCCH transmission of an EPDCCH set, where k is the frequency domain index and l is the time domain index.

A PRB is defined as 7 and 6 consecutive OFDM symbols for normal CP and extended CP in the time domain, respectively. A PRB is defined as 12 consecutive subcarriers in the frequency domain. The PRBs are numbered in the order of Listing (1)

```
-- ASN1START
CrossCarrierSchedulingConfig-r10 ::=    SEQUENCE {
    schedulingCellInfo-r10              CHOICE {
        own-r10                         SEQUENCE { -- No cross carrier scheduling
            cif-Presence-r10                BOOLEAN
        },
        other-r10                       SEQUENCE { -- Cross carrier scheduling
            schedulingCellId-r10            ServCellIndex-r10,
            pdsch-Start-r10                 INTEGER (1..4)
        }
    }
}
-- ASN1STOP
``` increasing frequency in the frequency domain. A PRB pair is defined as the two PRBs in one subframe having the same PRB index (PRB number).

The index l in the first slot in a subframe fulfils l≥l$_{EPDCCHStart}$. More specifically, the possible EPDCCH starting symbols are OFDM symbol #1, #2, #3 and #4 in the first slot of a subframe.

For a given serving cell, the UE 102 may be configured via higher layer signaling to receive PDSCH data transmissions according to transmission modes 1-9. If the UE 102 is configured with a higher layer parameter epdcch-StartSymbol-r11, then the starting OFDM symbol for EPDCCH given by index l$_{EPDCCHStart}$ in the first slot in a subframe may be determined from the higher layer parameter. Otherwise, the starting OFDM symbol for EPDCCH given by index l$_{EPDCCHStart}$ in the first slot in a subframe may be given by the CFI value in the subframe of the given serving cell when $N_{RB}^{DL}$>10 and l$_{EPDCCHStart}$ may be given by the CFI value+1 in the subframe of the given serving cell when $N_{RB}^{DL}$≤10.

For a given serving cell, if the UE 102 is configured via higher layer signaling to receive PDSCH data transmissions according to transmission mode 10, then for each EPDCCH-physical resource block (PRB)-set, the starting OFDM symbol for monitoring EPDCCH in subframe k is determined from the higher layer parameter pdsch-Start-r11. If the value of the parameter pdsch-Start-r11 belongs to {1,2,3,4}, then l'$_{EPDCCHStart}$ may be given by the higher layer parameter pdsch-Start-r11. Otherwise, l'$_{EPDCCHStart}$ may be given by the CFI value in subframe k of the given serving cell when $N_{RB}^{DL}$>10, and l'$_{EPDCCHStart}$ may be given by the CFI value+1 in subframe k of the given serving cell when $N_{RB}^{DL}$≤10.

Furthermore, if subframe k is indicated by the higher layer parameter mbsfn-SubframeConfigList-r11, or if subframe k is subframe 1 or 6 for frame structure type 2, then Otherwise, l$_{EPDCCHStart}$=min(2,l'$_{EPDCCHStart}$). Otherwise l$_{EPDCCHStart}$= l'$_{EPDCCHStart}$.

Demodulation reference signals (DM-RSs) associated with EPDCCH may be transmitted on antenna port 107-110. The DM-RSs are present and are valid references for EPDCCH demodulation only if the EPDCCH transmission is associated with the corresponding antenna ports. The DM-RSs may be transmitted PRBs upon which the corresponding EPDCCH is mapped.

Figure 7:
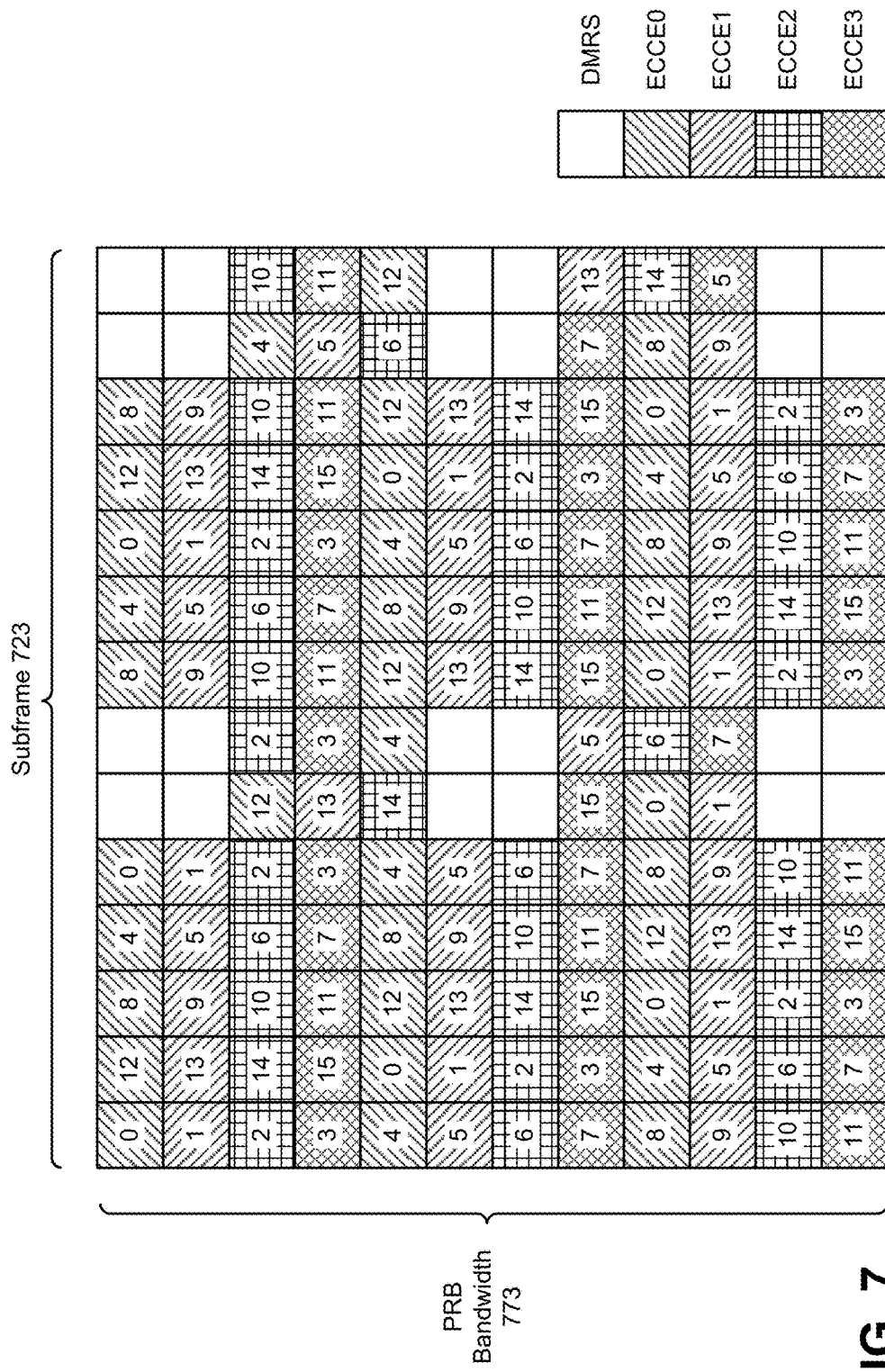
FIG. 7 illustrates an example of a first enhanced resource-element group (EREG)/enhanced control channel element (ECCE) structure.

A UE EREG/ECCE structure module 128 may determine an EREG/ECCE structure for monitoring an EPDCCH. An EREG may be used for defining the mapping of enhanced control channels to resource elements. FIG. 7 shows an example of an EREG and an ECCE structure.

The EPDCCH formats may also be defined. The EPDCCH carries scheduling assignments. An EPDCCH may be transmitted using an aggregation of one or several consecutive ECCEs. Each ECCE may consist of multiple EREGs. The number of EREGs per ECCE, $N_{EREG}^{ECCE}$, is given by Table (1). The number of ECCEs used for one EPDCCH may depend on the EPDCCH format as given by Table (2). Both localized and distributed transmission may be supported. An EPDCCH can use either localized or distributed transmission, differing in the mapping of ECCEs to EREGs and PRB pairs.

TABLE (1)

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

TABLE (2)

| | Number of ECCEs for one EPDCCH | | | |
|---|---|---|---|---|
| | Case A | | Case B | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

A UE 102 may monitor multiple EPDCCHs. One or two sets of physical resource-block pairs that a UE 102 monitors for EPDCCH transmissions may be configured. All EPDCCH candidates in EPDCCH set $X_m$ may use either only localized or only distributed transmission as configured by higher layers. Within EPDCCH set $X_m$ in subframe i, the ECCEs available for transmission of EPDCCHs are numbered from 0 to $N_{ECCE,m,i}$-1.

ECCE number n corresponds to EREGs numbered (n mod $N_{ECCE}^{RB}$)+j$N_{ECCE}^{RB}$ in PRB index $\lfloor n/N_{ECCE}^{RB} \rfloor$ for localized mapping. Alternatively, ECCE number n corresponds to EREGs numbered $\lfloor n/N_{RB}^{X_m} \rfloor$+j$N_{ECCE}^{RB}$ in PRB indices (n+j max(1, $N_{RB}^{X_m}/N_{EREG}^{ECCE}$))mod $N_{RB}^{X_m}$ for distributed mapping. In this case, j=0, 1, . . . , $N_{EREG}^{ECCE}$-1, $N_{EREG}^{ECCE}$ is the number of EREGs per ECCE, and $N_{ECCE}^{EB}$=16/$N_{EREG}^{ECCE}$ is the number of ECCEs per resource-block pair. The physical resource-block pairs constituting EPDCCH set $X_m$ are in this paragraph assumed to be numbered in ascending order from 0 to $N_{RB}^{X_m}$-1.

Self-scheduling for a licensed assisted access (LAA) SCell may also be defined. In an LAA SCell, even when the beginning of a given subframe is occupied by the other node, physical channel/signal transmission in the same subframe may start if it is ensured by LBT that the channel is clear in the middle of the subframe. Until ensuring that channel is clear, the eNB 160 may not transmit any DL signal (including PDSCH and EPDCCH). Here, the UE 102 does not know when the eNB 160 starts to transmit the DL signal. More specifically, the possible EPDCCH starting symbols may be an OFDM symbol other than OFDM symbol #1, #2, #3 and #4 in the first slot of a subframe. Also, the possible EPDCCH starting symbols may be an OFDM symbol in the second slot of the subframe. An example of self-scheduling for an LAA SCell is described in connection with FIG. 8.

There may be several options for the UE 102 to know the starting position of EPDCCH. In a first option (Option 1), the EPDCCH may have a fixed starting position. In the first option, the eNB 160 can transmit the EPDCCH only when it ensures availability of the channel before the fixed EPDCCH starting position (e.g., m-th OFDM symbol of a subframe, or n-th OFDM symbol in the second slot of a subframe). The UE 102 may attempt the EPDCCH blind decoding assuming the EPDCCH starts at the position.

For the first option, instead of the EPDCCH starting position derivation described above, the UE 102 may assume $l_{EPDCCHStart}=l^{LAA}_{EPDCCHStart}$, where $l^{LAA}_{EPDCCHStart}$ is a fixed value. The index l in the first slot in a subframe fulfils l≥8 (i.e. no RE is available in the first slot). The index l in the second slot in a subframe fulfils l≥$l_{EPDCCHStart}$.

In a second option (Option 2), the UE 102 may perform blind decoding of EPDCCH with multiple possible starting positions. In the second option, the eNB 160 can determine the EPDCCH starting position according to when it ensures availability of the channel. In an implementation, the EPDCCH may be allowed to start only at limited possible starting positions so that the number of blind decoding attempts is reduced. The UE 102 may attempt the EPDCCH blind decoding assuming each possible EPDCCH starting position. During EPDCCH blind decoding, the UE 102 may check CRC bits that are attached to the DCI format carried via the EPDCCH. This means that the UE 102 may know the exact EPDCCH starting position by a successful decoding of the EPDCCH.

For the second option, instead of the EPDCCH starting position derivation described above, the UE 102 may assume $l_{EPDCCHStart}=l^{LAA}_{EPDCCHStart}$, where candidates of $l^{LAA}_{EPDCCHStart}$ are predefined. Also each candidate may be linked to a corresponding s value. The possible values of s are 0 and 1. If s=0, the index l in the first slot in a subframe fulfils l≥$l_{EPDCCHStart}$, otherwise the index l in the first slot in a subframe fulfils l≥8 (i.e. no RE is available in the first slot) and the index l in the second slot in a subframe fulfils l≥$l_{EPDCCHStart}$.

Alternatively, for the second option, a new EREG and/or ECCE design may be beneficial. In this case, of the EPDCCH starting position for the normal cell (i.e. the EPDCCH starting position derived from either epdcch-StartSymbol-r11, pdsch-Start-r11 or CFI value) may be used for the LAA cell. An example of this EREG/ECCE structure is described in connection with FIG. 9. FIGS. 10A and 10B show examples of ECCE aggregation with the new ECCE structure.

In a third option (Option 3), the UE 102 may perform blind detection of a reference/synchronization/initial signal of which position corresponds to EPDCCH starting position. In the third option, the eNB 160 can determine the EPDCCH starting position according to when it ensures availability of the channel. The eNB 160 may transmit some kind of known signal (e.g., a reference signal, a synchronization signal or an initial signal (a preamble sequence)) together with EPDCCH. The UE 102 may try to detect the location of that signal by assessing the correlation of the reception signal and the known signal. After detecting the location of that signal, the UE 102 may attempt the EPDCCH blind decoding assuming a single EPDCCH starting position derived from the location of that signal. For example, a relative position of the EPDCCH from the location of that signal may be fixed. Alternatively, the eNB 160 and the UE 102 may share a table that specifies a correspondence relationship between the EPDCCH starting position and the location of that signal.

For the third option, instead of the EPDCCH starting position derivation described above, the UE 102 may assume $l_{EPDCCHStart}=l^{LAA}_{EPDCCHStart}$, where $l^{LAA}_{EPDCCHStart}$ is derived from the detected reference/synchronization/initial signal resource. The UE 102 may also obtain an s value depending on the detected reference/synchronization/initial signal resource. The possible values of s are 0 and 1. If s=0, the index l in the first slot in a subframe fulfils l≥$l_{EPDCCHStart}$, otherwise the index l in the first slot in a subframe fulfils l≥8 (i.e., no RE is available in the first slot) and the index l in the second slot in a subframe fulfils l≥$l_{EPDCCHStart}$.

Figure 11:
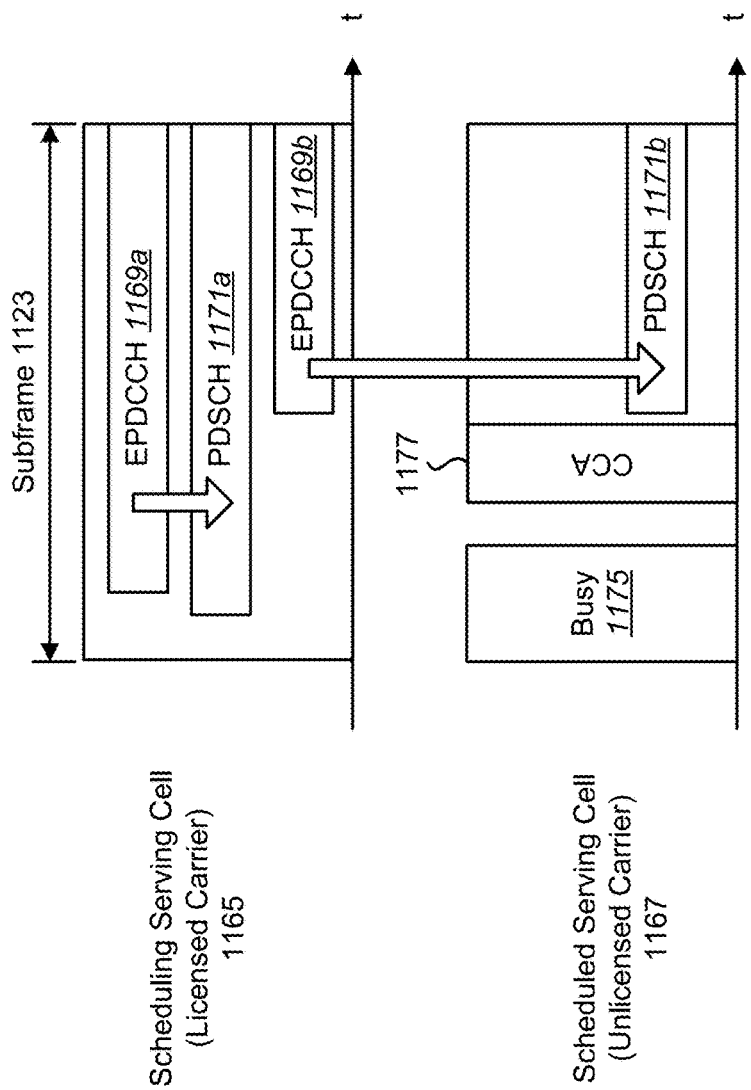
FIG. 11 is a block diagram illustrating an example of cross-carrier scheduling for LAA carriers.

Cross-carrier scheduling for an LAA SCell may also be defined. The EPDCCH starting position in the licensed carrier does not have to be located posterior to the LBT timing on the LAA SCell. However, for cross-carrier scheduling for the LAA SCell, scheduling of the EPDCCH in the non-LAA serving cell may start after ensuring the clear channel on the LAA SCell. Therefore, the above-described EPDCCH mapping on the LAA SCell can be used for an EPDCCH cross-carrier scheduling of resources on the LAA SCell. An example of cross-carrier scheduling for LAA carriers is described in connection with FIG. 11. Meanwhile, a self-scheduling EPDCCH in the non-LAA serving cell may start independently of the LBT on the LAA SCell as shown in FIG. 11.

If the UE 102 is configured with a CIF and if the DCI format size is the same, then the search space for the EPDCCH scheduling resources on the LAA SCell may be used for self-scheduling. More specifically, the eNB 160 may transmit the EPDCCH for the non-LAA cell using the search space for the EPDCCH for the LAA cell. Examples of search space sharing among scheduled serving cells are described in connection with FIGS. 12 and 13.

Figure 14:
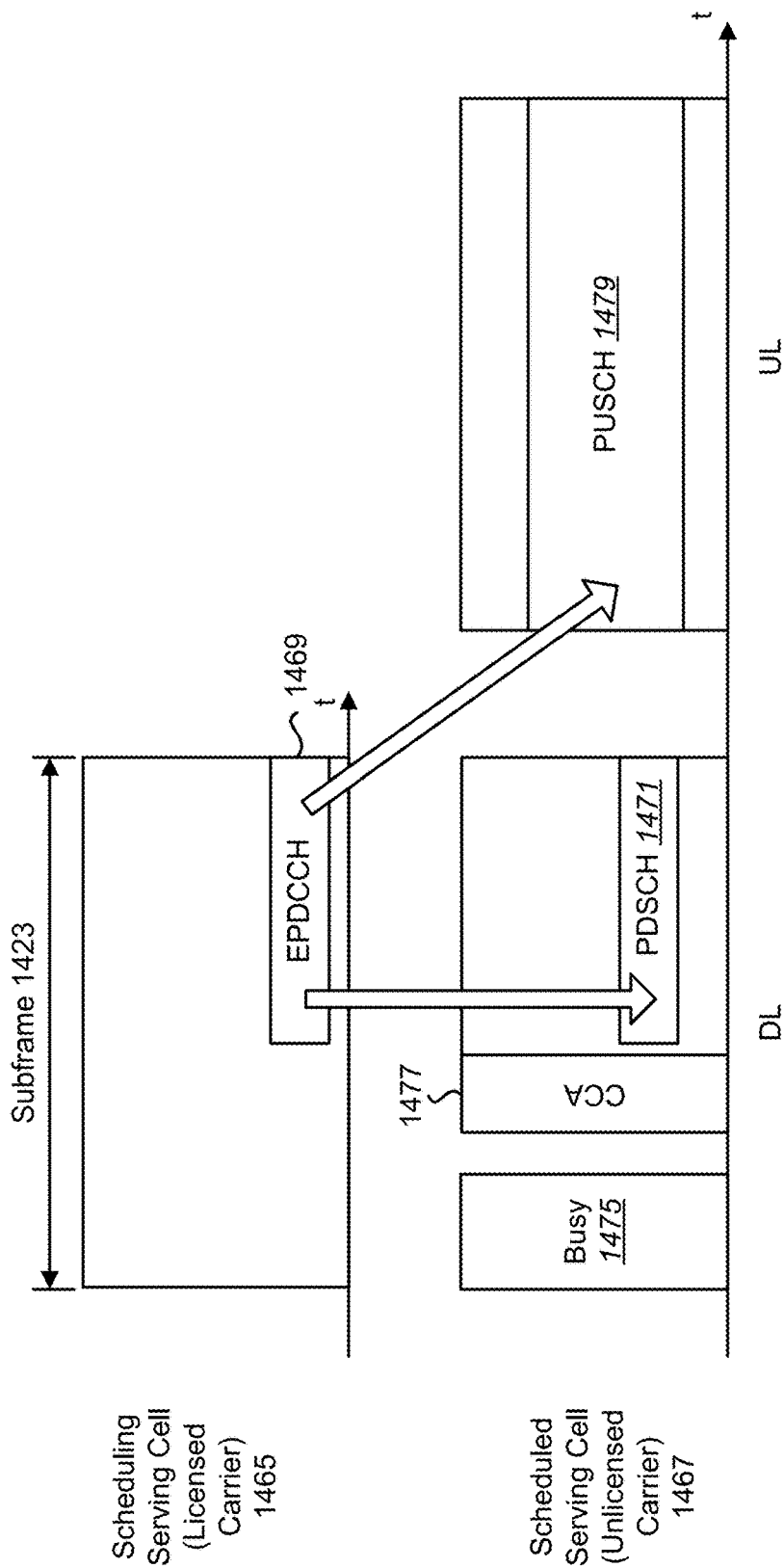
FIG. 14 is a block diagram illustrating an example of search space sharing for downlink (DL) assignment and uplink (UL) grant.

In one approach, EPDCCH search spaces (or an EPDCCH PRB set with the new EREG/ECCE structure) may be shared by DL assignment and UL grant. This may be accomplished as illustrated in FIG. 14.

Figure 15:
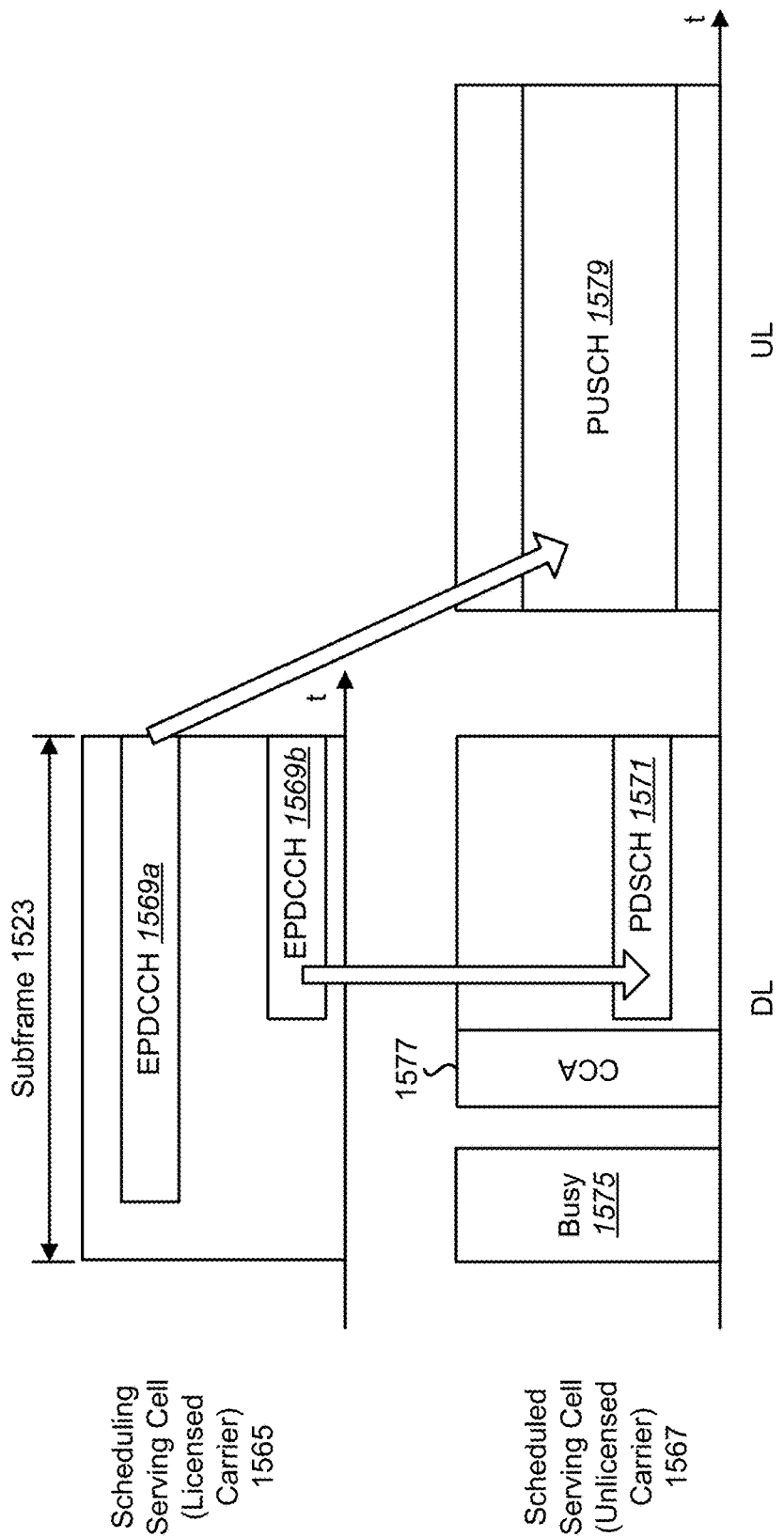
FIG. 15 is a block diagram illustrating another example of search space sharing for DL assignment and UL grant.

In another approach, EPDCCH search spaces (or EPDCCH PRB set) for the UL grant may be defined (or configured) independently of those for the DL assignment. This may be accomplished as illustrated in FIG. 15.

In yet another approach, the EPDCCH search spaces (or the EPDCCH PRB set) for the UL grant may be defined (or configured) either independently of those for the DL assignment or may be shared by DL assignment and UL grant. This may be accomplished as described in connection with FIG. 16.

For the EPDCCH search spaces (or the EPDCCH PRB set) of which the EPDCCH starting position is based on either CFI or a dedicated RRC message may be used only for the UL grant. On the other hand, the EPDCCH search spaces (or the EPDCCH PRB set) of which the EPDCCH starting position is derived by either one of the above options may be shared by the UL grant and the DL assignment. Moreover, the above-described EPDCCH structure (EPDCCH structure for a non-LAA cell) may be applied for the EPDCCH carrying the UL grant while the new EPDCCH structure may be applied for both the EPDCCH carrying the DL assignment and that carrying the UL grant. Note that the DL assignment corresponds to DCI format 1A/1B/1D/1/2A/2/2B/2C/2D and the UL grant corresponds to DCI format 0/4/5.

Figure 17:
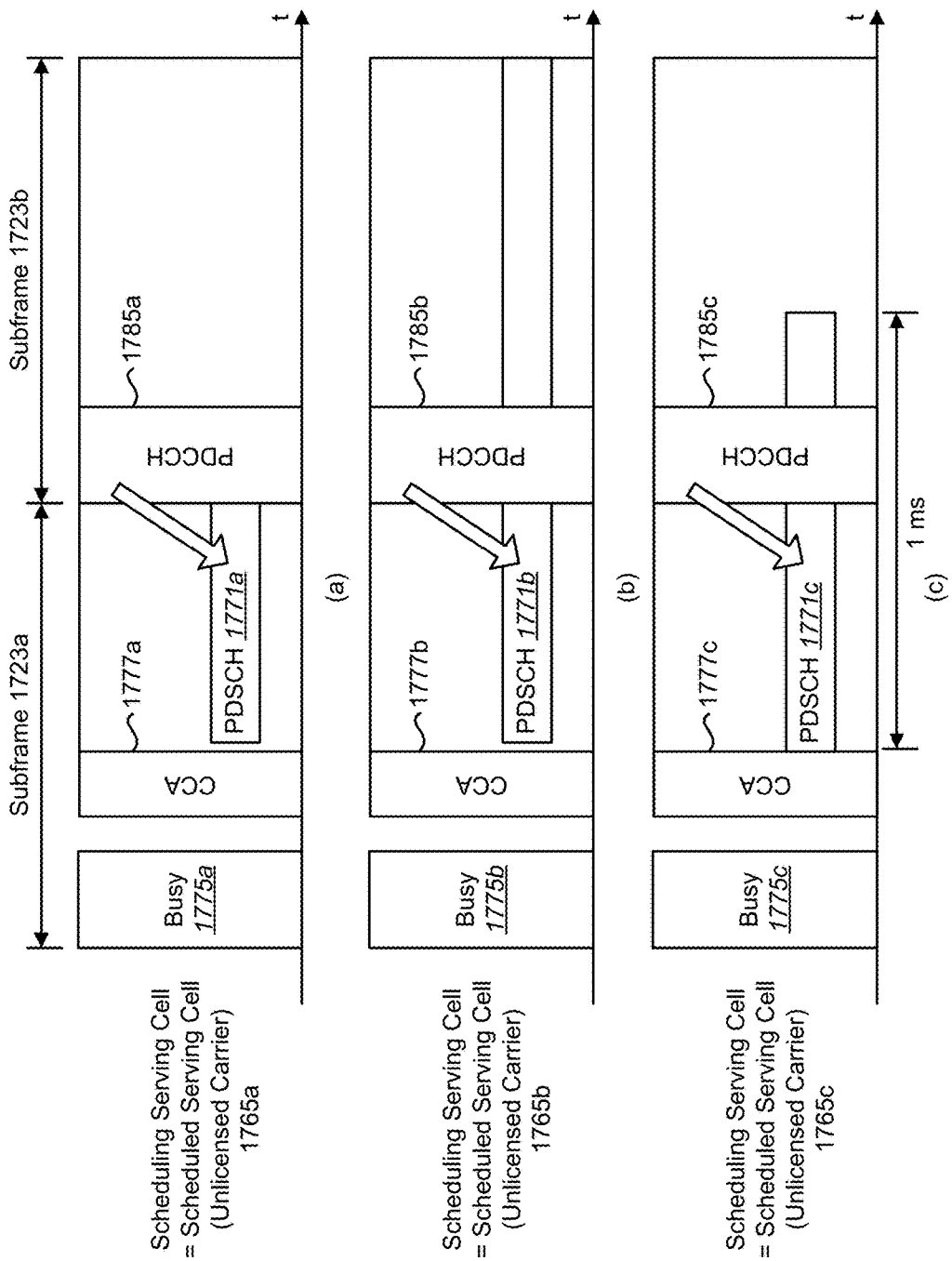
FIG. 17 is a block diagram illustrating an example of PDCCH-based self-scheduling for an LAA cell.

In another implementation, self- and cross-carrier scheduling for LAA SCell may be based on the PDCCH. Unlike the EPDCCH, it may be preferable that a PDCCH mapping rule is unified, since CRS may be transmitted together with the PDCCH for demodulation of the PDCCH. However, the PDCCH might not be able to be transmitted in the subframe where CCA is performed, since the PDCCH may be located at the beginning part of a subframe. To solve this issue, the PDCCH in subframe i may carry the DL assignment for the PDSCH in subframe i–1. FIG. 17 shows some examples.

Figure 18:
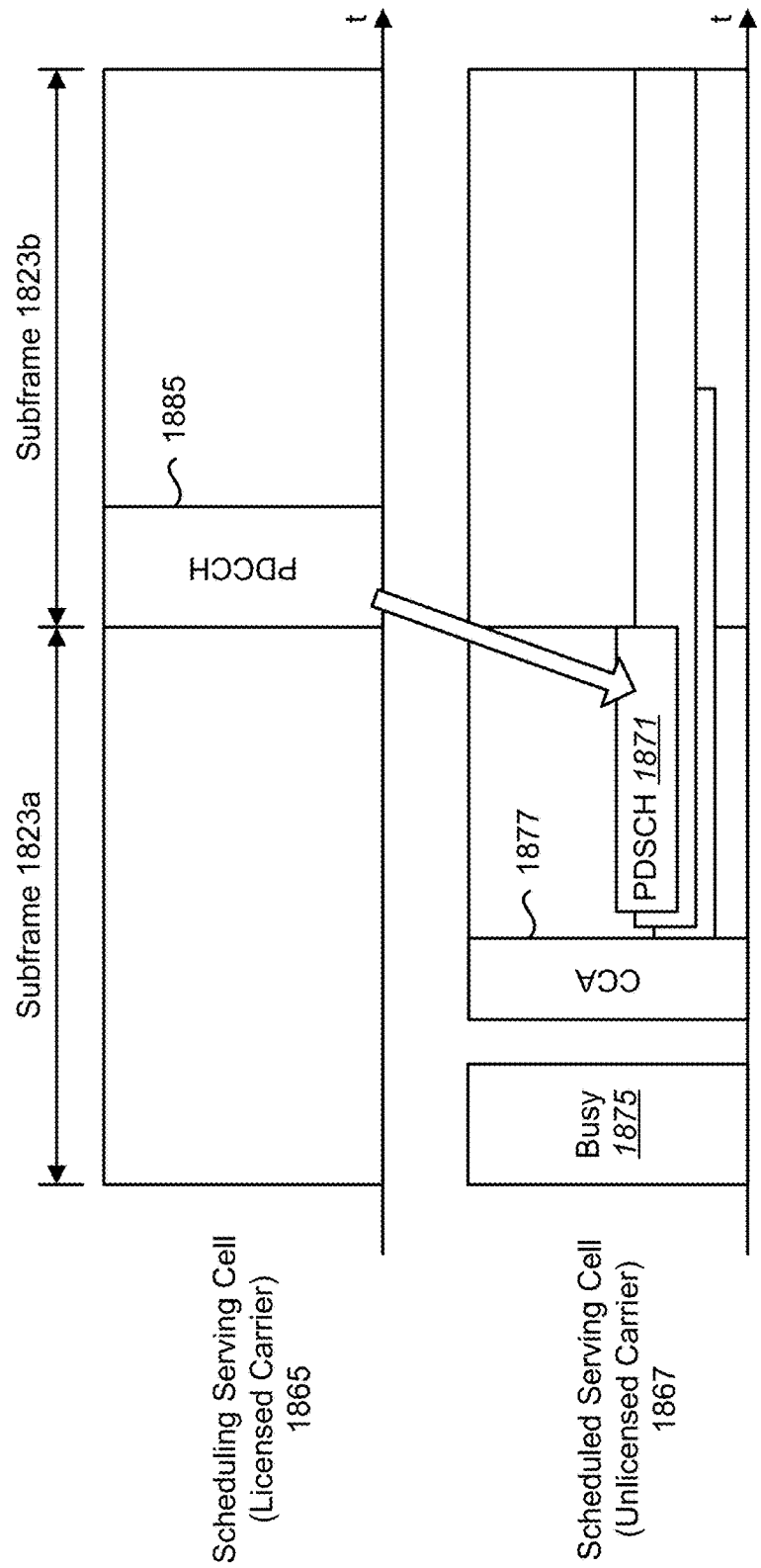
FIG. 18 is a block diagram illustrating another example of PDCCH-based cross-carrier scheduling for an LAA cell.

For cross-carrier scheduling for an LAA SCell, the PDCCH on the scheduling cell in subframe i may carry the DL assignment for the PDSCH on the scheduled cell in subframe i−1. As shown in FIG. 18, this principle can be applied regardless of the TTI type (i.e., cases (a) to (c)) in FIG. 17.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB EPDCCH starting position module 194 and an eNB EREG/ECCE structure module 196.

The eNB EPDCCH starting position module 194 may determine the starting position for transmitting an EPDCCH. This may be accomplished as described above.

The eNB EREG/ECCE structure module 196 may determine an EREG/ECCE structure for transmitting an EPDCCH. This may be accomplished as described above.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode information 101, including transmission data 105.

The encoder 109 may encode transmission data 105 and/or other information included in the information 101 provided by the eNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on the PSS and SSS. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
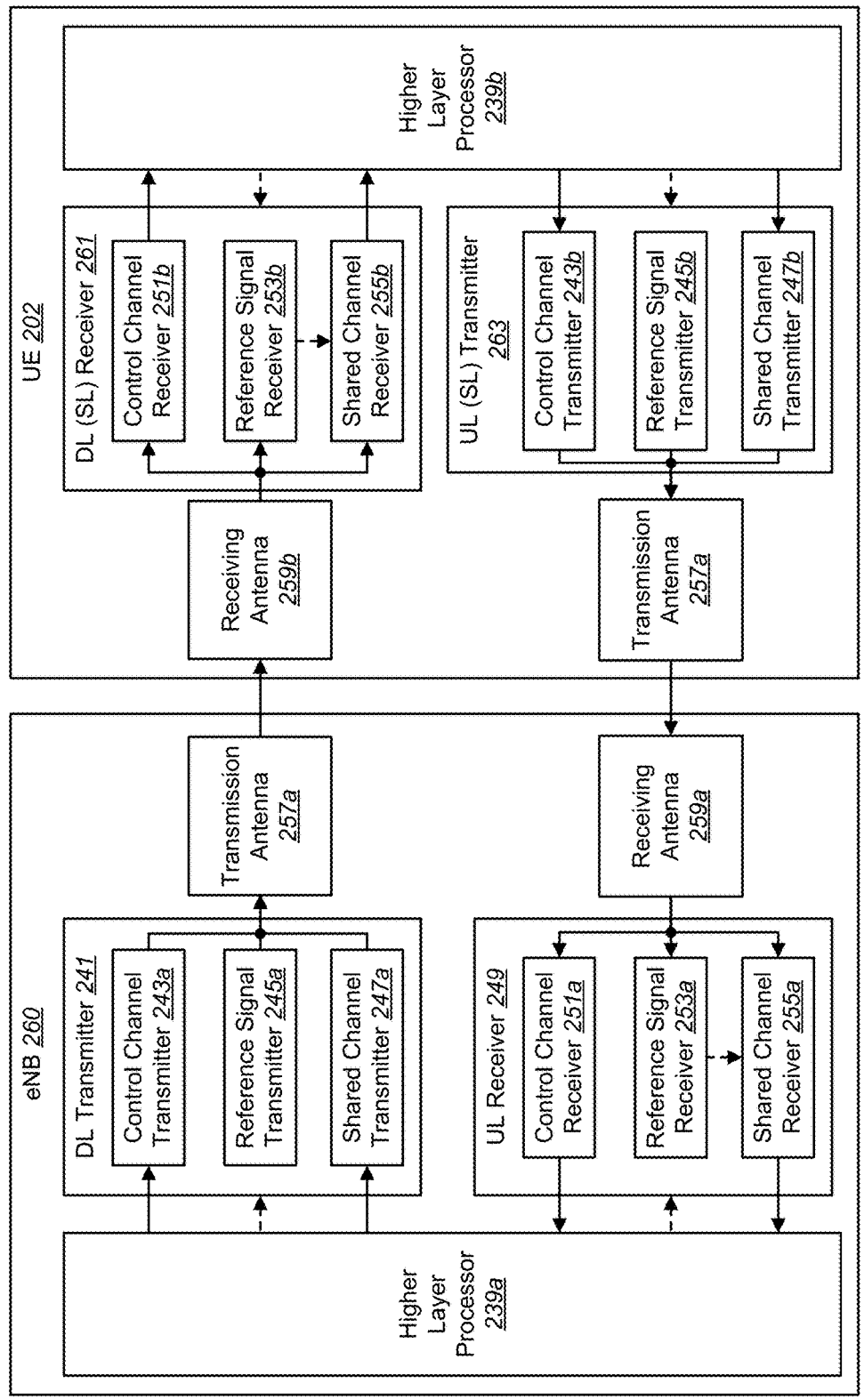
FIG. 2 is block diagram illustrating a detailed configuration of an eNB and a UE in which systems and methods for LAA may be implemented.

FIG. 2 is block diagram illustrating a detailed configuration of an eNB 260 and a UE 202 in which systems and methods for LAA may be implemented. The eNB 260 may include a higher layer processor 239a, a DL transmitter 241 and a UL receiver 249. The higher layer processor 239a may communicate with the DL transmitter 241, UL receiver 249 and subsystems of each.

The DL transmitter 241 may include a control channel transmitter 243a, a reference signal transmitter 245a and a shared channel transmitter 247a. The DL transmitter 241 may transmit signals/channels to the UE 202 using a transmission antenna 257a.

The UL receiver 249 may include a control channel receiver 251a, a reference signal receiver 253a and a shared channel receiver 255a. The UL receiver 249 may receive signals/channels from the UE 202 using a receiving antenna 259a. The reference signal receiver 253a may provide signals to the shared channel receiver 255a based on the received reference signals.

The eNB 260 may configure, in the UE 202, a first serving cell (e.g., a non-LAA cell) and a second serving cell (e.g., an LAA cell). The higher layer processor 239a may be configured to send an RRC message for enhanced resource element group (EREG) configuration.

The eNB 260 may transmit EPDCCH scheduling resources in a subframe on the first serving cell on the basis of a first EREG structure. For example, a physical downlink control channel transmitter (e.g., the control channel transmitter 243a) may be configured to transmit the EPDCCH on the basis of the first EREG structure if the EREG configuration is not established. The eNB 260 may transmit the corresponding PDSCH on the first serving cell. The new EREG structure may be configured in either one of per-UE 202, per-scheduling serving cell, per-scheduled serving cell or per-EPDCCH-PRB set basis.

The eNB 260 may configure, in the UE 202, a second EREG structure for EPDCCH scheduling resources are in the subframe on the second serving cell. The eNB 260 may perform LBT on the second serving cell within the subframe. If the channel is clear in the CCA timeslot (and if a backoff counter expires), then the eNB 260 may transmit the EPDCCH scheduling resources in the subframe on the second serving cell on the basis of the second EREG structure. The eNB 260 may transmit the corresponding PDSCH on the second serving cell.

The UE 202 may include a higher layer processor 239b, a DL (SL) receiver 261 and a UL (SL) transmitter 263. The higher layer processor 239b may communicate with the DL (SL) receiver 261, UL (SL) transmitter 263 and subsystems of each.

The DL (SL) receiver 261 may include a control channel receiver 251b, a reference signal receiver 253b and a shared channel receiver 255b. The DL (SL) receiver 261 may receive signals/channels from the UE 202 using a receiving antenna 259b. The reference signal receiver 253b may provide signals to the shared channel receiver 255b based on the received reference signals. For example, the shared channel receiver 255b may be configured to receive the PDSCH for which the same antenna port is used as for the reference signals.

The UL (SL) transmitter 263 may include a control channel transmitter 243b, a reference signal transmitter 245b and a shared channel transmitter 247b. The UL (SL) transmitter 263 may send signals/channels to the eNB 260 using a transmission antenna 257b.

The UE 202 may be configured with the first serving cell and the second serving cell. The higher layer processor 239b may be configured to receive an RRC message for EREG configuration.

The UE 202 may monitor an EPDCCH scheduling resource in a subframe on the first serving cell on the basis of a first EREG structure. If the EPDCCH is detected, the UE 202 receives the corresponding PDSCH on the first serving cell.

The UE 202 may be configured with a second EREG structure for EPDCCH scheduling resources in the subframe on the second serving cell. The UE 202 may monitor the EPDCCH scheduling resources in the subframe on the second serving cell on the basis of the second EREG structure. If the EPDCCH is detected, the UE 202 may receive the corresponding PDSCH on the second serving cell.

Figure 3:
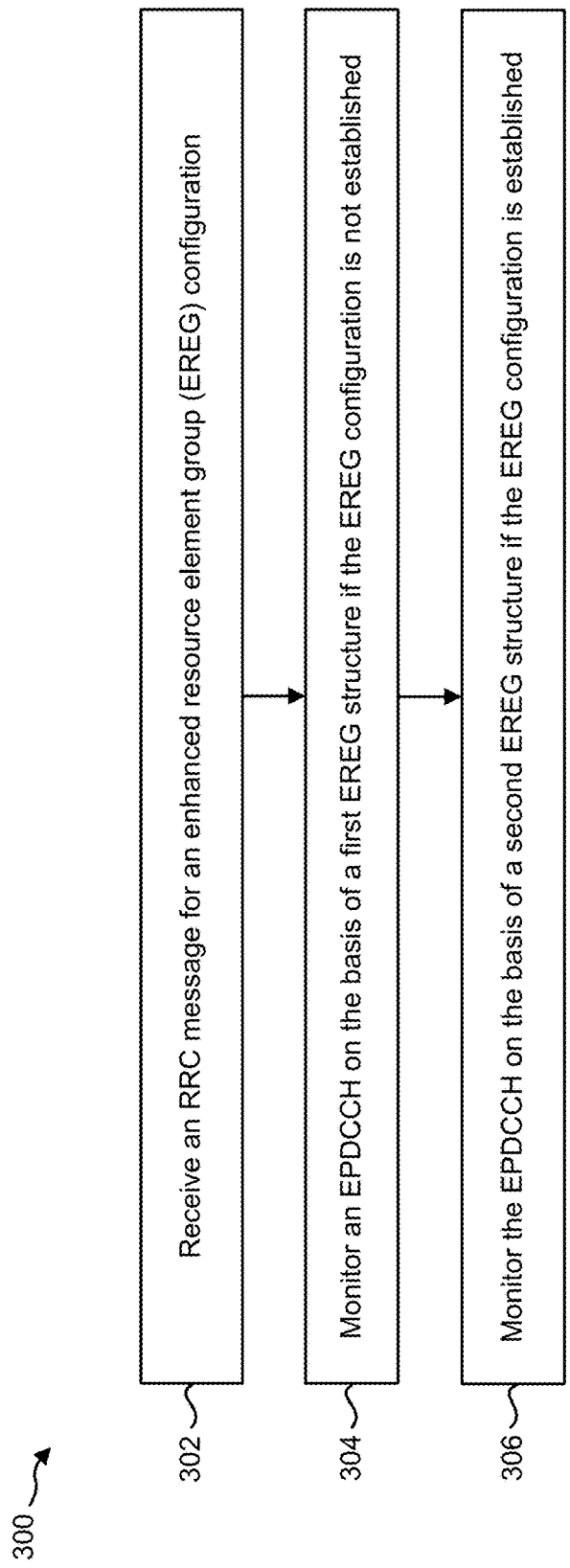
FIG. 3 is a flow diagram illustrating a method for LAA by a UE.

FIG. 3 is a flow diagram illustrating a method 300 for LAA by a UE 102. The UE 102 may receive 302 an RRC message for an enhanced resource element group (EREG) configuration. The EREG configuration may have a first EREG structure or a second EREG structure. All resource elements (REs) with number i in a physical resource block (PRB) pair may include an EREG number i.

In the first EREG structure, the EREG number i may be based on numbering of all resource elements, except for resource elements carrying demodulation reference signal (DM-RS), in a PRB pair cyclically from an index set in an increasing order of first frequency and then time. In the second EREG structure, the EREG number i may be based on numbering of all resource elements, except for resource elements carrying demodulation reference signal (DM-RS), on a set of consecutive OFDM symbols within the PRB pair cyclically from a subset of the index set in an increasing order of first frequency and then time.

A single subframe may include a first slot and a second slot in time domain. In the first EREG structure, each EREG may include both resource elements (REs) belonging to the first slot and REs belonging to the second slot. In the second EREG structure, each EREG may include either the REs belonging to the first slot or the REs belonging to the second slot.

A single enhanced control channel element (ECCE) may include a plurality of EREGs of which the REs belong to the same set of consecutive OFDM symbols within the PRB pair. The EPDCCH may include a plurality of ECCEs of which the REs belong to the same set of consecutive OFDM symbols within the PRB pair.

The UE 102 may monitor 304 an EPDCCH on the basis of the first EREG structure if the EREG configuration is not established. The UE 102 may monitor 306 the EPDCCH on the basis of the second EREG structure if the EREG configuration is established.

Figure 4:
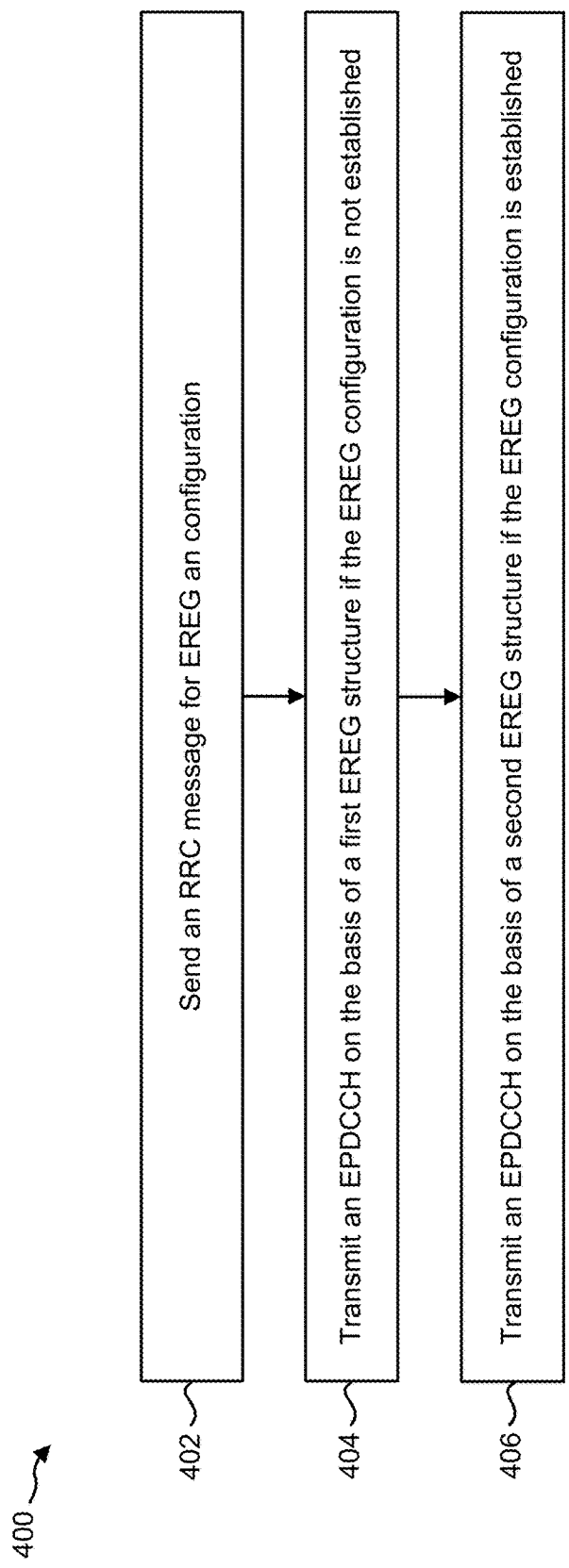
FIG. 4 is a flow diagram illustrating a method for LAA by an eNB.

FIG. 4 is a flow diagram illustrating a method 400 for LAA by an eNB 160. The eNB 160 may send 402 an RRC message for EREG an configuration. The EREG configuration may have a first EREG structure or a second EREG structure, as described above in connection with FIG. 3.

The eNB 160 may transmit 404 an EPDCCH on the basis of the first EREG structure if the EREG configuration is not established. The eNB 160 may transmit 406 an EPDCCH on the basis of the second EREG structure if the EREG configuration is established. This may be accomplished as described in connection with FIG. 3.

Figure 5:
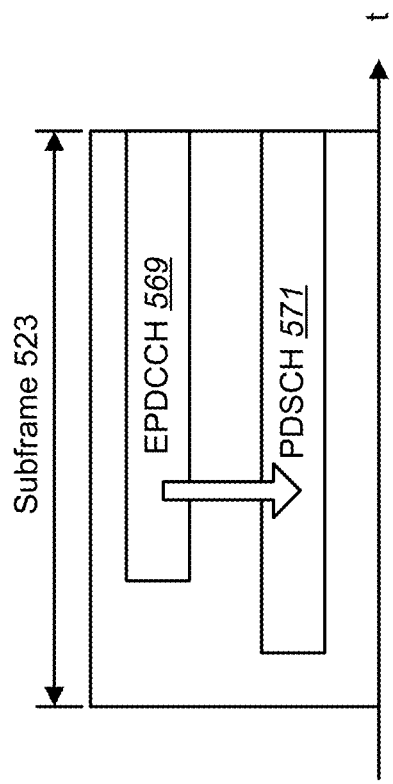
FIG. 5 is a block diagram illustrating an example of self-scheduling within a licensed carrier.

FIG. 5 is a block diagram illustrating an example of self-scheduling within a licensed carrier. A subframe 523 is shown with respect to time t. In this example of self-scheduling, the scheduling serving cell 565 is also the scheduled serving cell. The EPDCCH 569 of the serving cell schedules PDSCH 571 resources of that serving cell, as indicated by the arrow.

Figure 6:
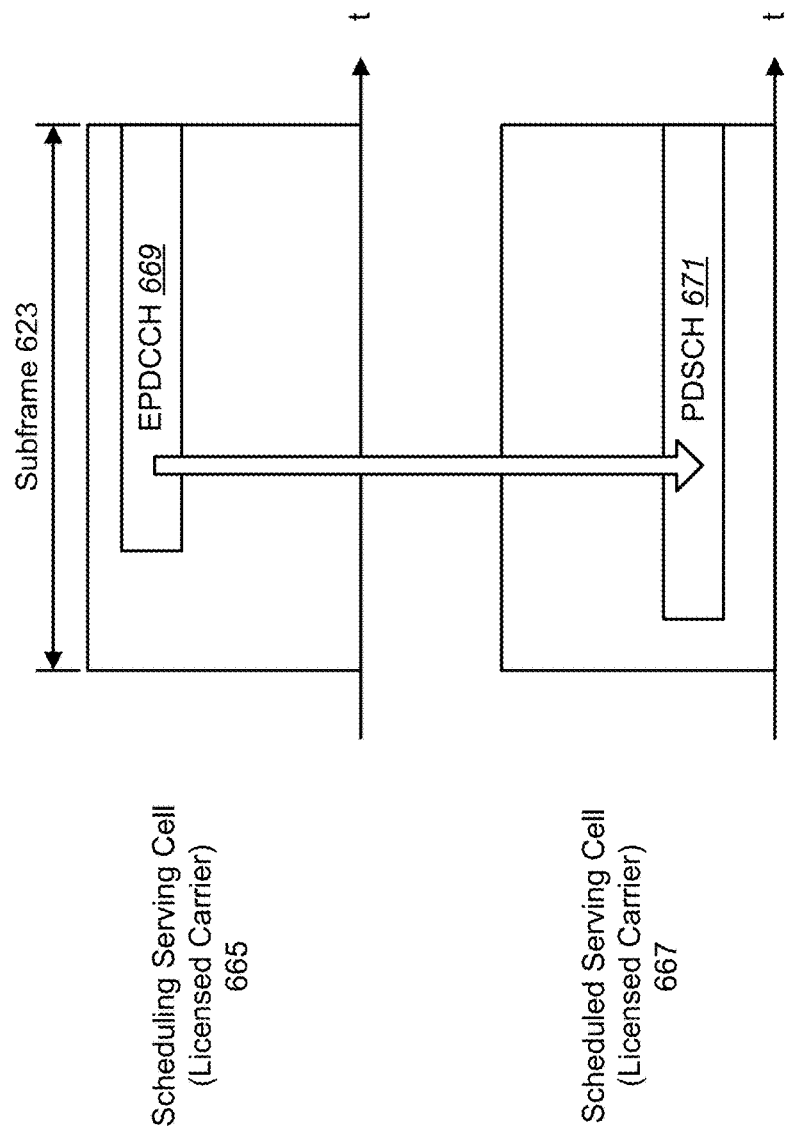
FIG. 6 is a block diagram illustrating an example of cross-carrier scheduling among licensed carriers.

FIG. 6 is a block diagram illustrating an example of cross-carrier scheduling among licensed carriers. A subframe 623 is shown for both a scheduling serving cell 665 and a scheduled serving cell 667 with respect to time t. In this example of cross-carrier scheduling, both serving cells are licensed carriers.

Cross-carrier scheduling with the CIF may allow the (E)PDCCH of a serving cell to schedule resources on another serving cell. The EPDCCH 669 of the scheduling serving cell 665 schedules PDSCH 671 resources of the scheduled serving cell 667.

FIG. 7 illustrates an example of a first EREG/ECCE structure. In this example, there are 16 EREGs, numbered from 0 to 15, per PRB pair. The PRB bandwidth 773 for a subframe 723 is shown.

All resource elements, except resource elements carrying DM-RS for antenna ports 107-110 for normal cyclic prefix or 107-108 for extended cyclic prefix, are numbered in a physical resource-block pair cyclically from 0 to 15 in an increasing order of first frequency, then time. All resource elements with number i in that PRB pair constitute EREG number i.

The EPDCCH may carry scheduling assignments. An EPDCCH may be transmitted using an aggregation of one or several consecutive ECCEs. Each ECCE may include multiple EREGs. In one example, ECCE0 consists of EREG0, EREG4, EREG8 and EREG12. ECCE1 consists of EREG1, EREG5, EREG9 and EREG13. ECCE2 consists of EREG2, EREG6, EREG10 and EREG14. ECCE3 consists of EREG3, EREG7, EREG11 and EREG15. Eventually, one ECCE distributes within a PRB pair in time and frequency domain.

Figure 8:
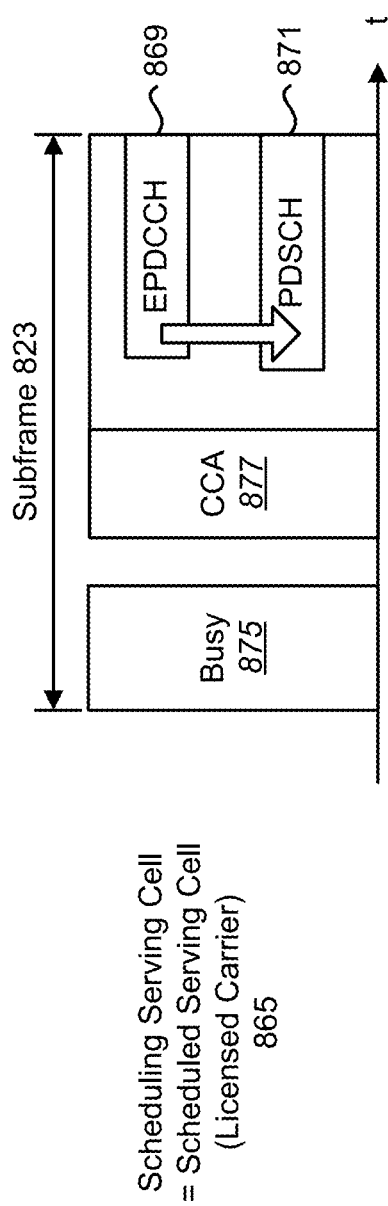
FIG. 8 is a block diagram illustrating an example of self-scheduling within an unlicensed carrier.

FIG. 8 is a block diagram illustrating an example of self-scheduling within an unlicensed carrier. A subframe 823 is shown with respect to time t. In this example of self-scheduling, the scheduling serving cell 865 is also the scheduled serving cell. The EPDCCH 869 of the serving cell schedules PDSCH 871 resources of that serving cell. In this example, the scheduling serving cell 865 may be an LAA SCell. In this case, the scheduling serving cell 865 may perform CCA 877 after a busy 875 period.

Figure 9:
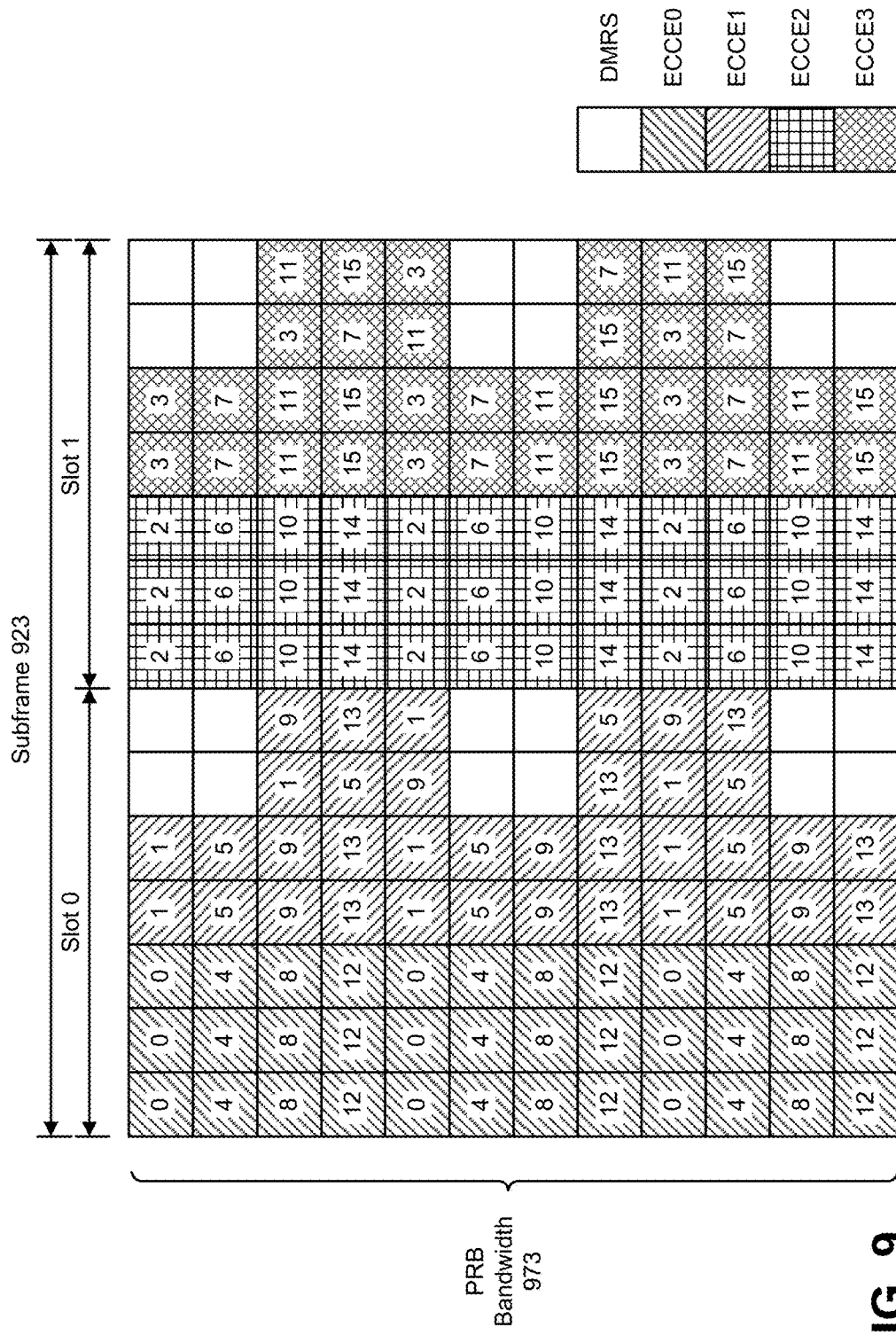
FIG. 9 illustrates an example of a second EREG/ECCE structure.
Figure 10A:
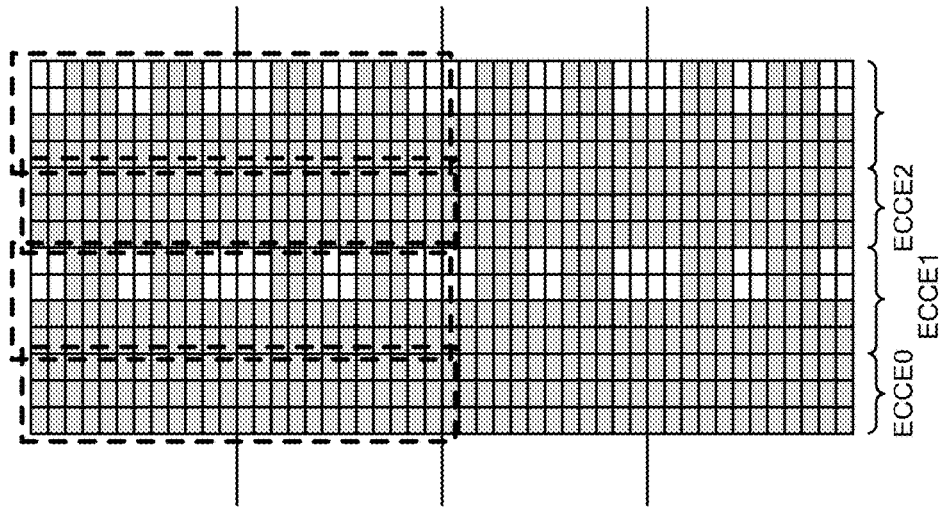
FIGS. 10A and 10B show examples of ECCE aggregation according to the second ECCE structure.
Figure 10A:
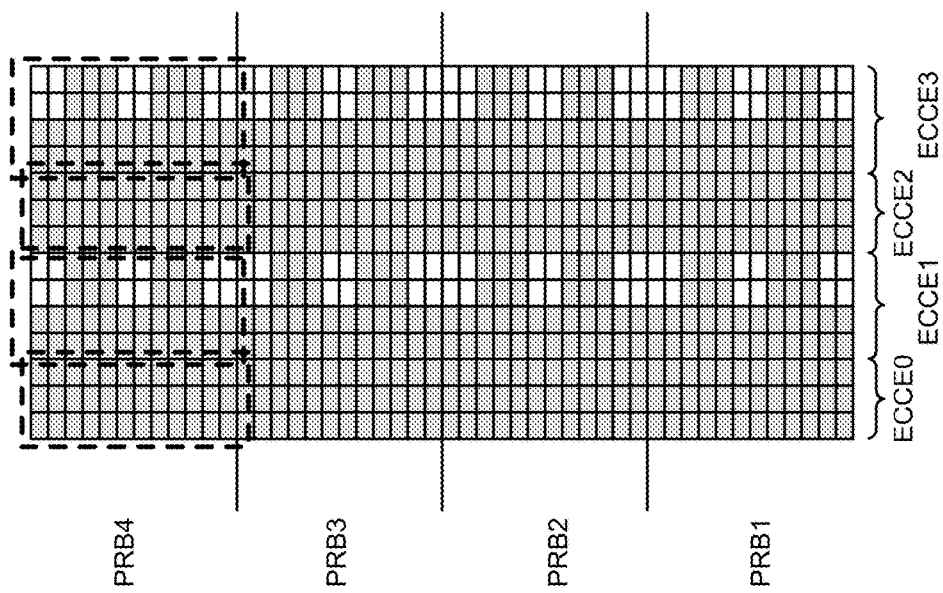
Figure 10B:
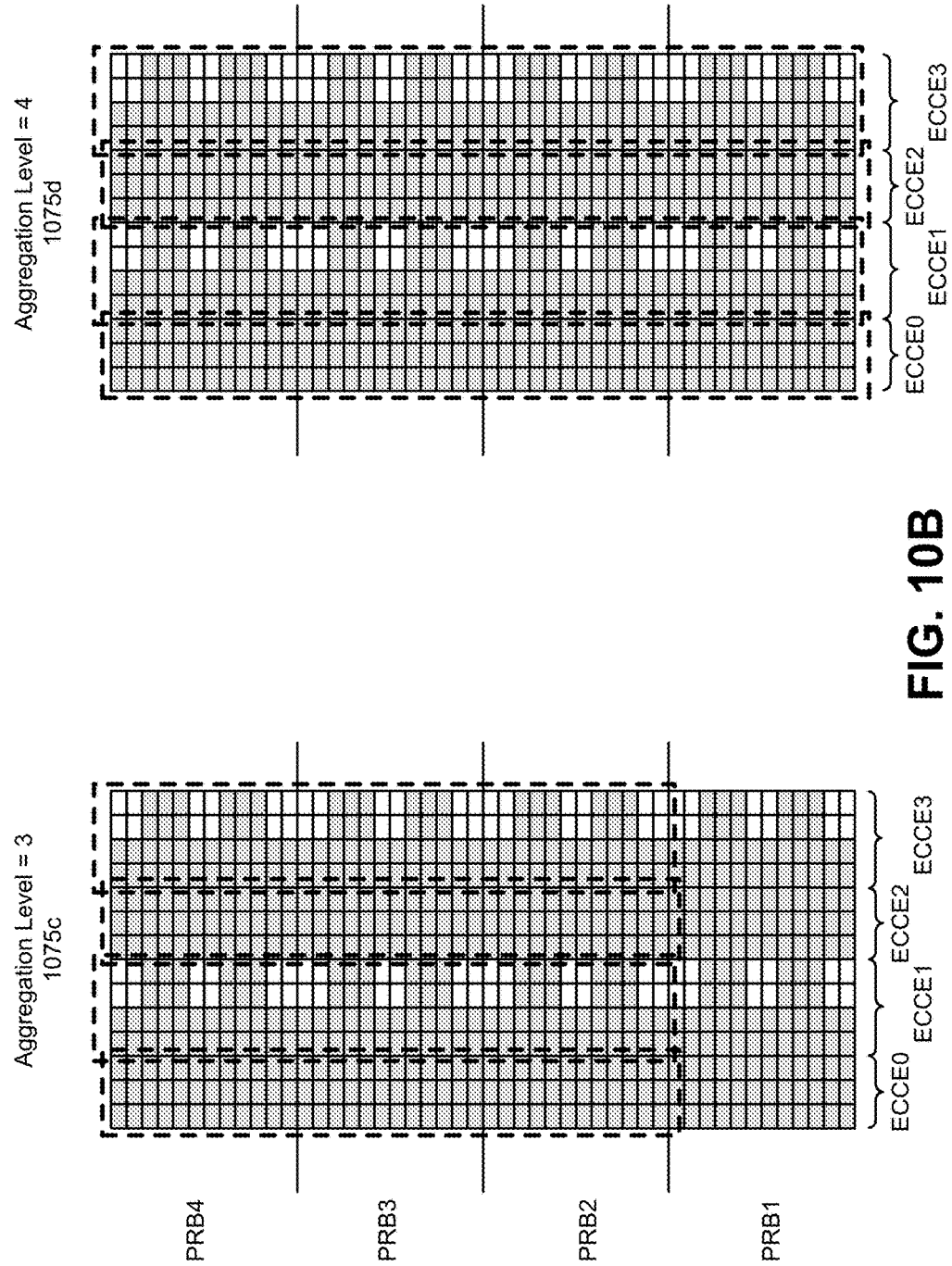

FIG. 9 illustrates an example of a second EREG/ECCE structure. The second EREG/ECCE structure may be used for an LAA SCell. The PRB bandwidth 973 for a subframe 923 is shown.

The resource elements in the first three OFDM symbols of the first slot (slot 0) in a physical resource-block pair may be numbered cyclically among {0, 4, 8, 12} in an increasing order of first frequency and then time. The resource elements, except resource elements carrying DM-RS for antenna ports 107-110 for normal cyclic prefix or 107-108 for extended cyclic prefix, in the remaining OFDM symbols of the first slot (slot 0) in a physical resource-block pair may be numbered cyclically among {1, 5, 9, 13} in an increasing order of first frequency and then time.

The resource elements in the first three OFDM symbols of the second slot (slot 1) in a physical resource-block pair may be numbered cyclically among {2, 6, 10, 14} in an increasing order of first frequency and then time. The resource elements, except resource elements carrying DM-RS for antenna ports 107-110 for normal cyclic prefix or 107-108 for extended cyclic prefix, in the remaining OFDM symbols of the second slot in a physical resource-block pair may be numbered cyclically among {3, 7, 11, 15} in an increasing order of first frequency and then time.

All resource elements with number i in that physical resource-block pair constitute EREG number i. EREG to ECCE mapping may be the same as the first EREG/ECCE structure, as described in connection with FIG. 7. In the new structure of FIG. 9, REs constituting each EREG/ECCE in a PRB pair get closer in time domain compared to the first EREG/ECCE structure.

In this example, ECCE0 consists of EREG0, EREG4, EREG8 and EREG12 that are located on OFDM symbol #0-#2 in Slot 0. ECCE1 consists of EREG1, EREG5, EREG9 and EREG13 that are located on OFDM symbol #3-#6 in Slot 0. ECCE2 consists of EREG2, EREG6, EREG10 and EREG14 that are located on OFDM symbol #0-#2 in Slot 1. ECCE3 consists of EREG3, EREG7, EREG11 and EREG15 that are located on OFDM symbol #3-#6 in Slot 1. In other words, the possible EPDCCH starting symbols $l_{EPDCCHStart}$ could be OFDM symbol #0, #3, #7 and #10. Although FIG. 9 shows an example of EREG to ECCE mapping for localized transmission, the same mapping between ECCE indices and EREG indices may be applied to a distributed transmission except that EREGs in different PRBs constitute an ECCE.

Eventually, one ECCE distributes within a PRB pair in frequency domain but is concentrated in time domain. The DMRS in Slot 0 may be used only for demodulation of EPDCCH consisting of EREG/ECCE mapped in Slot 0. The DMRS in Slot 1 may be used only for demodulation of EPDCCH consisting of EREG/ECCE mapped in Slot 1. Alternatively, the DMRS in Slot 1 may also be used for demodulation of EPDCCH consisting of EREG/ECCE mapped in Slot 0.

The new EREG/ECCE structure may be applied based on higher-layer configuration. An RRC message for EPDCCH configuration may have a field for indicating whether or not the new EREG/ECCE structure is used. Alternatively, whether or not the new EREG/ECCE structure is used may depend on whether or not the scheduled cell is an LAA cell. In this instance, the new EREG/ECCE structure is used if the scheduled cell is an LAA cell. Otherwise, the existing EREG/ECCE structure (e.g., the first EREG/ECCE structure for non-LAA cell of FIG. 7) may be used.

FIGS. 10A and 10B show examples of ECCE aggregation according to the second ECCE structure. As described above, an EPDCCH may be transmitted using an aggregation of one or several consecutive ECCEs. Each of the dashed boxes in FIGS. 10A and 10B show an example of an ECCE set (a set of aggregated ECCEs), each of which constitutes a single EPDCCH.

In a first aggregation 1075a (aggregation level=1), the ECCE of PRB4 is used by itself. In a second aggregation 1075b (aggregation level=2), the ECCEs of PRB4 and PRB3 are aggregated. In a third aggregation 1075c (aggregation level=3), the ECCEs of PRB4, PRB3 and PRB2 are aggregated. In a fourth aggregation 1075d (aggregation level=4), the ECCEs of PRB4, PRB3, PRB2 and PRB1 are aggregated.

Even when aggregated, ECCEs constituting an EPDCCH are localized in time domain. To be more specific, a single EPDCCH may consist of multiple ECCEs that are mapped on the same set of OFDM symbols (e.g. 3 or 4 consecutive OFDM symbols) of a subframe in the different PRB pairs.

According to this, the eNB 160 can schedule the EPDCCH assignment considering the LBT result. Furthermore, each EPDCCH candidate with the same aggregation level 1075 has almost the same number of available REs. This makes the eNB's EPDCCH coding rate determination procedure easier.

FIG. 11 is a block diagram illustrating an example of cross-carrier scheduling for LAA carriers. A subframe 1123 is shown for both a scheduling serving cell 1165 and a scheduled serving cell 1167 with respect to time t. In this example of cross-carrier scheduling, the scheduling serving cell 1165 is a licensed carrier and the scheduled serving cell 1167 is an unlicensed carrier (e.g., LAA cell).

For cross-carrier scheduling for the LAA SCell, scheduling of the EPDCCH 1169b in the non-LAA serving cell may start after ensuring the clear channel on the LAA SCell (e.g., after the busy period 1175 and performing CCA 1177). The EPDCCH 1169b of the non-LAA serving cell 1165 schedules PDSCH 1171b resources of the LAA SCell cell 1167. Therefore, the above-described EPDCCH mapping on the LAA SCell can be used for an EPDCCH cross-carrier scheduling of resources on the LAA SCell. Meanwhile, a self-scheduling EPDCCH 1169a and PDSCH 1171a in the non-LAA serving cell 1165 may start independently of the LBT on the LAA SCell 1167.

Figure 12:
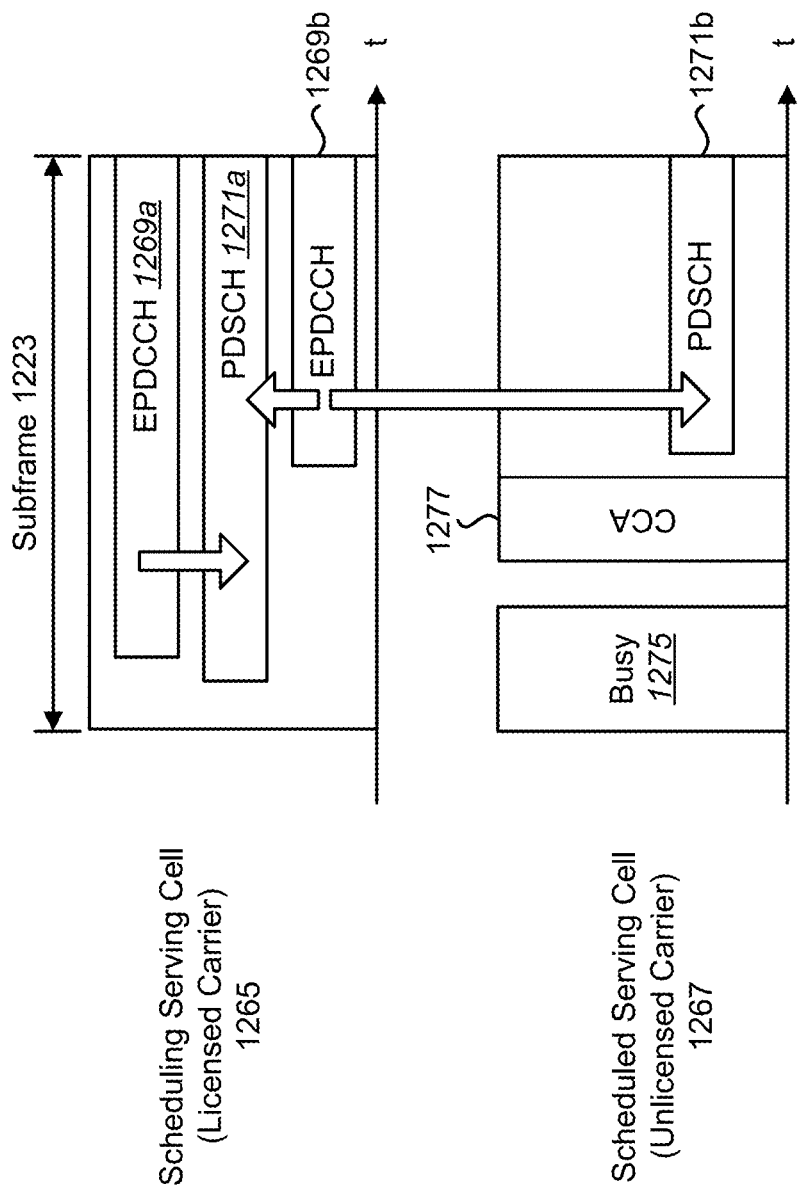
FIG. 12 is a block diagram illustrating an example of search space sharing among scheduled serving cells.

FIG. 12 is a block diagram illustrating an example of search space sharing among scheduled serving cells 1267. A subframe 1223 is shown for both a scheduling serving cell 1265 and a scheduled serving cell 1267 with respect to time t. In this example of cross-carrier scheduling, the scheduling serving cell 1265 is a licensed carrier and the scheduled serving cell 1267 is an unlicensed carrier (e.g., LAA cell). LBT may be performed in the subframe 1223 on the scheduled serving cell 1267 (i.e., the LAA SCell). In this example, CCA 1277 follows a busy 1275 period.

For cross-carrier scheduling for the LAA SCell 1267, scheduling of the EPDCCH 1269b in the non-LAA serving cell 1265 may start after ensuring the clear channel on the LAA SCell 1267 (e.g., after the busy period 1275 and performing CCA 1277). The EPDCCH 1269b of the non-LAA serving cell 1265 schedules PDSCH 1271b resources of the LAA SCell 1267. Meanwhile, a self-scheduling EPDCCH 1269a and PDSCH 1271a in the non-LAA serving cell 1265 may start independently of the LBT on the LAA SCell 1267.

If the UE 102 is configured with CIF and if the DCI format size is the same, search space for the EPDCCH scheduling resources on the LAA SCell may be used also for self-scheduling. More specifically, the eNB 160 may transmit the EPDCCH 1269b for the non-LAA cell 1265 using the search space for the EPDCCH for the LAA cell 1267. The UE 102 may monitor a set of EPDCCH candidates on one or more activated serving cells as configured by higher layer signaling for control information, where monitoring implies attempting to decode each of the EPDCCHs in the set according to the monitored DCI formats. The set of EPDCCH candidates to monitor are defined in terms of EPDCCH UE-specific search spaces.

In the implementation of FIG. 12, the UE 102 may monitor the EPDCCH 1169b for the non-LAA cell 1165 on a search space for the EPDCCH for the LAA cell. In one case, UE 102 may be configured to monitor EPDCCH candidates in a given serving cell with a given DCI format size with CIF, and CRC scrambled by C-RNTI, where the EPDCCH candidates may have one or more possible values of CIF for the given DCI format size and the EPDCCH starting position is based on either epdcch-StartSymbol-r11, pdsch-Start-r11 or CFI value. In this case, the UE 102 may assume that an EPDCCH candidate with the given DCI format size is transmitted in the given serving cell in any EPDCCH UE-specific search space corresponding to any of the possible values of CIF, except for the CIF corresponding to LAA serving cell, for the given DCI format size.

In another case, a UE 102 may be configured to monitor EPDCCH candidates in a given serving cell with a given DCI format size with CIF, and CRC scrambled by C-RNTI, where the EPDCCH candidates may have one or more possible values of CIF for the given DCI format size and the EPDCCH starting position is not based on either epdcch-StartSymbol-r11, pdsch-Start-r11 or CFI value. In this case, the UE 102 may assume that an EPDCCH candidate with the given DCI format size is transmitted in the given serving cell in any EPDCCH UE-specific search space corresponding to any of the possible values of CIF for the given DCI format size.

Figure 13:
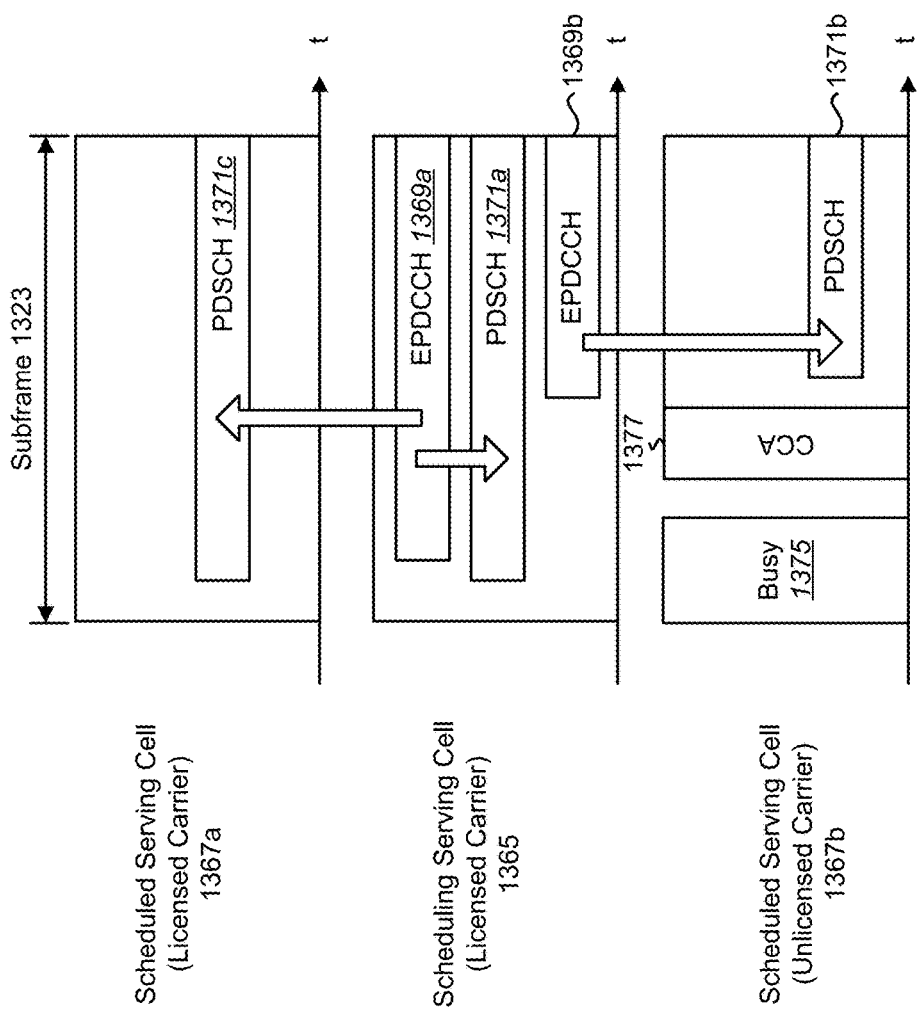
FIG. 13 is a block diagram illustrating another example of search space sharing among scheduled serving cells.

FIG. 13 is a block diagram illustrating another example of search space sharing among scheduled serving cells. A subframe 1323 is shown for both a scheduling serving cell 1365, a scheduled serving cell 1367a of a licensed carrier and a scheduled serving cell 1367b of an unlicensed carrier (e.g., LAA cell) with respect to time t. In this example of cross-carrier scheduling, the scheduling serving cell 1365 is a licensed carrier (e.g., non-LAA cell). LBT may be performed in the subframe 1323 on the unlicensed scheduled serving cell 1367b (i.e., the LAA SCell). In this example, CCA 1377 follows a busy 1375 period.

For cross-carrier scheduling for the LAA scheduled serving cell 1367b, scheduling of the EPDCCH 1369b in the non-LAA scheduling serving cell 1365 may start after ensuring the clear channel on the LAA scheduled serving cell 1367b (e.g., after the busy period 1375 and performing CCA 1377). The EPDCCH 1369b of the non-LAA scheduling serving cell 1365 schedules PDSCH 1371b resources of the LAA scheduled serving cell 1367. Meanwhile, a self-scheduling EPDCCH 1369a and PDSCH 1371a in the non-LAA scheduling serving cell 1365 may start independently of the LBT on the LAA scheduled serving cell 1367b. The EPDCCH 1369a of the non-LAA scheduling serving cell 1365 may schedule PDSCH 1371c resources of the non-LAA scheduled serving cell 1367a.

In the implementation of FIG. 13, even if the UE 102 is configured with CIF and the DCI format size is the same, the search space for the EPDCCH scheduling resources on the SCell may not be used for self-scheduling if the SCell is an LAA cell. More specifically, the eNB 160 may not transmit the EPDCCH for the non-LAA cell using the search space for the EPDCCH for the LAA cell while the eNB 160 may transmit the EPDCCH for the non-LAA cell using the search space for the EPDCCH for another non-LAA cell. The UE 102 may not monitor the EPDCCH for the non-LAA cell on the search space for the EPDCCH for the LAA cell while the UE 102 may monitor the EPDCCH for the non-LAA cell on the search space for the EPDCCH for another non-LAA cell.

In one case, a UE 102 may be configured to monitor EPDCCH candidates in a given serving cell with a given DCI format size with CIF, and CRC scrambled by C-RNTI, where the EPDCCH candidates may have one or more possible values of CIF for the given DCI format size and the EPDCCH starting position is based on either epdcch-Start-Symbol-r11, pdsch-Start-r11 or CFI value. In this case, the UE 102 may assume that an EPDCCH candidate with the given DCI format size is transmitted in the given serving cell in any EPDCCH UE-specific search space corresponding to any of the possible values of CIF, except for the CIF corresponding to LAA serving cell, for the given DCI format size.

In another case, a UE 102 configured to monitor EPDCCH candidates in a given serving cell with a given DCI format size with CIF, and CRC scrambled by C-RNTI, where the EPDCCH candidates may have one or more possible values of CIF for the given DCI format size and the EPDCCH starting position is not based on either epdcch-StartSymbol-r11, pdsch-Start-r11 or CFI value. In this case, the UE 102 may assume that an EPDCCH candidate with the given DCI format size is transmitted in the given serving cell in any EPDCCH UE-specific search space corresponding to any of the possible values of CIF corresponding to LAA serving for the given DCI format size.

FIG. 14 is a block diagram illustrating an example of search space sharing for DL assignment and UL grant. A DL subframe 1423 is shown for both a scheduling serving cell 1465 and a scheduled serving cell 1467 with respect to time t. An UL subframe is also shown for the scheduled serving cell 1467 with respect to time t. In this example of cross-carrier scheduling, the scheduling serving cell 1465 is a licensed carrier and the scheduled serving cell is an unlicensed carrier (e.g., LAA cell). LBT may be performed in the DL subframe 1423 on the scheduled serving cell 1467 (i.e., the LAA SCell). In this example, CCA 1477 follows a busy 1475 period.

In the approach illustrated in FIG. 14, EPDCCH 1469 search spaces (or an EPDCCH PRB set with the new EREG/ECCE structure) may be shared by DL assignment and UL grant. The PDSCH 1471 in subframe n may be scheduled by the DL assignment in subframe n. On the other hand, PUSCH 1479 in subframe n may be scheduled by the UL grant in subframe n−4.

FIG. 15 is a block diagram illustrating another example of search space sharing for DL assignment and UL grant. A DL subframe 1523 is shown for both a scheduling serving cell 1565 and a scheduled serving cell 1567 with respect to time t. An UL subframe is also shown for the scheduled serving cell 1567 with respect to time t. In this example of cross-carrier scheduling, the scheduling serving cell 1565 is a licensed carrier and the scheduled serving cell is an unlicensed carrier (e.g., LAA cell). LBT may be performed in the DL subframe 1523 on the scheduled serving cell 1567 (i.e., the LAA SCell). In this example, CCA 1577 follows a busy 1575 period.

In the approach illustrated in FIG. 15, EPDCCH search spaces (or EPDCCH PRB set) for the UL grant may be defined (or configured) independently of those for the DL assignment. The PDSCH 1571 in subframe n may be scheduled by the DL assignment in subframe n. On the other hand, PUSCH 1579 in subframe n may be scheduled by the UL grant in subframe n−4. The EPDCCH 1569*a* starting position for the UL grant may be based on either CFI or a dedicated RRC message. The EPDCCH 1569*b* starting position for the DL assignment may be derived by either one of the above options (e.g., Option 1-3). Moreover, EPDCCH structures may also be independent between EPDCCH search spaces (or EPDCCH PRB set) for the UL grant and those for the DL assignment. The existing EPDCCH structure may be applied for the EPDCCH carrying the UL grant while the new EPDCCH structure may be applied for the EPDCCH carrying the DL assignment.

Figure 16:
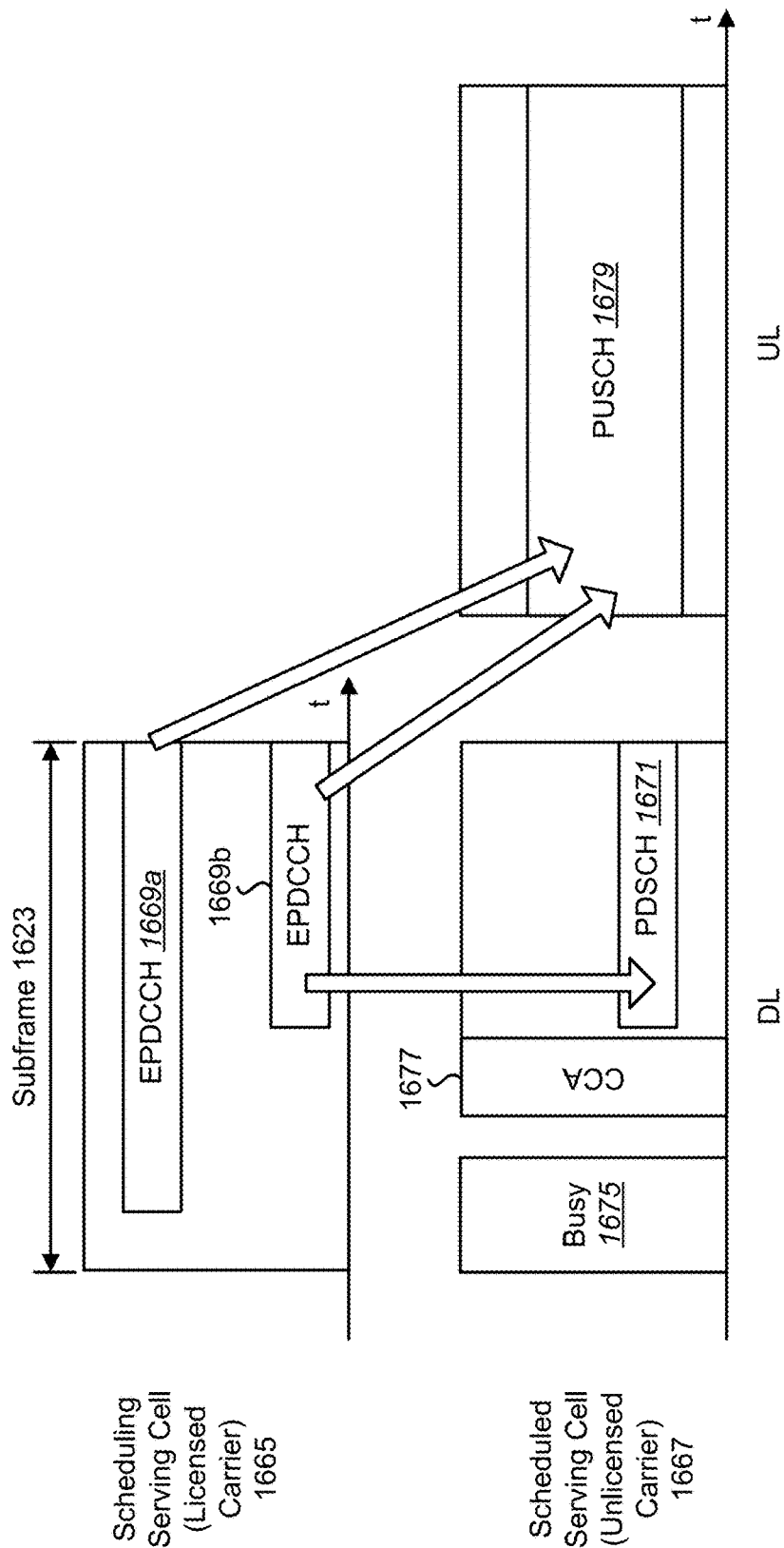
FIG. 16 is a block diagram illustrating yet another example of search space sharing for DL assignment and UL grant.

FIG. 16 is a block diagram illustrating yet another example of search space sharing for DL assignment and UL grant. A DL subframe 1623 is shown for both a scheduling serving cell 1665 and a scheduled serving cell 1667 with respect to time t. An UL subframe is also shown for the scheduled serving cell 1667 with respect to time t. In this example of cross-carrier scheduling, the scheduling serving cell 1665 is a licensed carrier and the scheduled serving cell 1667 is an unlicensed carrier (e.g., LAA cell). LBT may be performed in the DL subframe 1623 on the scheduled serving cell 1667 (i.e., the LAA SCell). In this example, CCA 1677 follows a busy 1675 period.

In the approach illustrated in FIG. 16, the EPDCCH search spaces (or the EPDCCH PRB set) for the UL grant may be defined (or configured) either independently of those for the DL assignment or may be shared by DL assignment and UL grant. The PDSCH 1671 in subframe n may be scheduled by the DL assignment in subframe n. On the other hand, PUSCH 1679 in subframe n may be scheduled by the UL grant in subframe n−4. In this case, the EPDCCH 1669*b* that schedules PDSCH 1671 may also schedule PUSCH 1679. Alternatively, another EPDCCH 1669*a* may schedule PUSCH 1679.

FIG. 17 is a block diagram illustrating an example of PDCCH-based self-scheduling for an LAA cell. Two subframes 1723 are shown with respect to time t. A first subframe 1723*a* is also referred to as subframe i−1. A second subframe 1723*b* is also referred to as subframe i. In these examples of self-scheduling, the scheduling serving cell 1765 is also the scheduled serving cell. In this example, the scheduling serving cell 1765 may be an LAA SCell.

In case (a), scheduling serving cell 1767*a* may perform LBT in the DL subframe 1723*a* where, CCA 1777*a* follows a busy 1775*a* period. In this case, the PDCCH 1785*a* in subframe i may carry the DL assignment for a shorter transmission time interval (TTI) mapped in the PDSCH 1771*a* of subframe i−1.

In case (b), scheduling serving cell 1767*b* may perform LBT in the DL subframe 1723*b* where, CCA 1777*b* follows a busy 1775*b* period. In this case, the PDCCH 1785*b* in subframe i may carry the DL assignment for a longer TTI (also referred to as a super TTI) mapped across the PDSCH 1771*b* of subframe i−1 and that of subframe i.

In case (c), scheduling serving cell 1767*c* may perform LBT in the DL subframe 1723*c* where, CCA 1777*c* follows a busy 1775*c* period. In this case, the PDCCH 1785*c* in subframe i may carry the DL assignment for a normal TTI (1 ms long TTI) mapped across the PDSCH 1771*c* of subframe i−1 and that of subframe i. Here, TTI may correspond to a transport block size (TBS), because transport block is generated per TTI. In other words, short and long TTIs are corresponding to small and large TBSs respectively.

FIG. 18 is a block diagram illustrating another example of PDCCH-based cross-carrier scheduling for an LAA cell. Two subframes 1823 are shown with respect to time t. A first subframe 1823a is also referred to as subframe i−1. A second subframe 1823b is also referred to as subframe i. In this example of cross-carrier scheduling, the scheduling serving cell 1865 is a licensed carrier and the scheduled serving cell 1867 is an unlicensed carrier (e.g., LAA cell). LBT may be performed in the subframe 1823 on the scheduled serving cell 1867 (i.e., the LAA SCell). In this example, CCA 1877 follows a busy 1875 period.

For cross-carrier scheduling for an LAA SCell, the PDCCH 1885 on the scheduling serving cell 1865 in subframe i may carry the DL assignment for the PDSCH 1871 on the scheduled serving cell 1867 in subframe i−1. As shown in FIG. 18, this principle can be applied regardless of the TTI type (i.e., cases (a) to (c)) in FIG. 17.

In this case, if the UE 102 is configured with CIF and if the DCI format size is the same, the search space in subframe i for the PDCCH 1885 scheduling resources in subframe i−1 on the LAA SCell may be used for self-scheduling within subframe i. More specifically, the eNB 160 may transmit, in subframe i, the PDCCH 1885 for the subframe i of the non-LAA cell using the search space for the PDCCH 1885 for the subframe i−1 of the LAA cell. The UE 102 may monitor the PDCCH 1885 for the subframe i of the non-LAA cell on the search space for the PDCCH 1885 for the subframe i−1 of the LAA cell. Similarly, the search space for the PDCCH 1885 carrying DL assignment for the subframe i−1 can be used for the PDCCH 1885 carrying UL grant for the subframe i+4.

Figure 19:
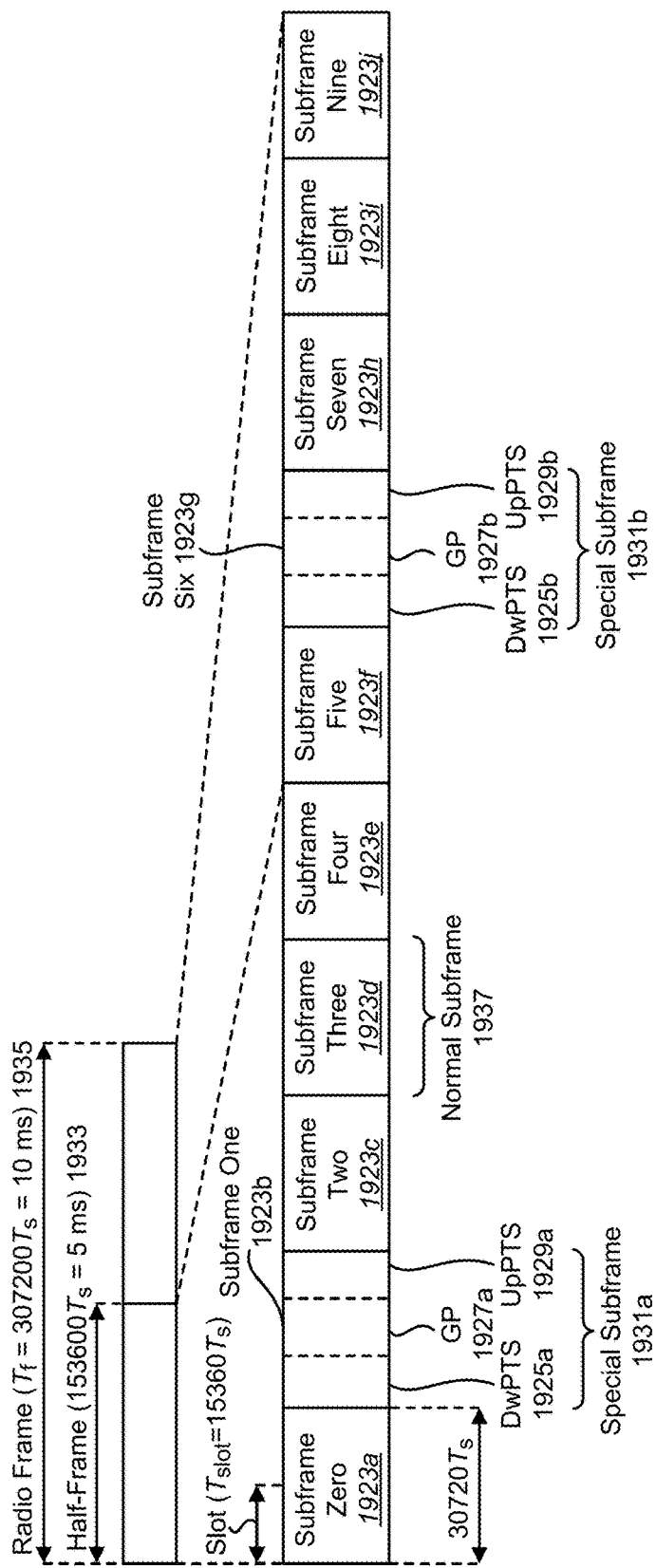
FIG. 19 is a diagram illustrating one example of a radio frame that may be used in accordance with the systems and methods disclosed herein.

FIG. 19 is a diagram illustrating one example of a radio frame 1935 that may be used in accordance with the systems and methods disclosed herein. This radio frame 1935 structure illustrates a TDD structure. Each radio frame 1935 may have a length of $T_f=307200 \cdot T_s=10$ ms, where $T_f$ is a radio frame 1935 duration and $T_s$ is a time unit equal to $$\frac{1}{(15000 \times 2048)}$$

seconds. The radio frame 1935 may include two half-frames 1933, each having a length of $153600 \cdot T_s=5$ ms. Each half-frame 1933 may include five subframes 1923a-e, 1923f-j each having a length of $30720 \cdot T_s=1$ ms.

TDD UL/DL configurations 0-6 are given below in Table (3) (from Table 4.2-2 in 3GPP TS 36.211). UL/DL configurations with both 5 millisecond (ms) and 10 ms downlink-to-uplink switch-point periodicity may be supported. In particular, seven UL/DL configurations are specified in 3GPP specifications, as shown in Table (3) below. In Table (3), "D" denotes a downlink subframe, "S" denotes a special subframe and "U" denotes a UL subframe.

TABLE (3)

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table (3) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (4) (from Table 4.2-1 of 3GPP TS 36.211) subject to the total length of DwPTS, GP and UpPTS being equal to $30720 \cdot T_s=1$ ms. In Table (4), "cyclic prefix" is abbreviated as "CP" and "configuration" is abbreviated as "Config" for convenience.

TABLE (4)

| Special Subframe Config | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 1923 that may be used include a downlink subframe, an uplink subframe and a special subframe 1931. In the example illustrated in FIG. 19, which has a 5 ms periodicity, two standard special subframes 1931a-b are included in the radio frame 1935. The remaining subframes 1923 are normal subframes 1937.

The first special subframe 1931a includes a downlink pilot time slot (DwPTS) 1925a, a guard period (GP) 1927a and an uplink pilot time slot (UpPTS) 1929a. In this example, the first standard special subframe 1931a is included in subframe one 1923b. The second standard special subframe 1931b includes a downlink pilot time slot (DwPTS) 1925b, a guard period (GP) 1927b and an uplink pilot time slot (UpPTS) 1929b. In this example, the second standard special subframe 1931b is included in subframe six 1923g. The length of the DwPTS 1925a-b and UpPTS 1929a-b may be given by Table 4.2-1 of 3GPP TS 36.211 (illustrated in Table (4) above) subject to the total length of each set of DwPTS 1925, GP 1927 and UpPTS 1929 being equal to $30720 \cdot T_s = 1$ ms.

Each subframe i 1923a-j (where i denotes a subframe ranging from subframe zero 1923a (e.g., 0) to subframe nine 1923j (e.g., 9) in this example) is defined as two slots, 2i and 2i+1 of length $T_{slot} = 15360 \cdot T_s = 0.5$ ms in each subframe 1923. For example, subframe zero (e.g., 0) 1923a may include two slots, including a first slot.

UL/DL configurations with both 5 ms and 10 ms downlink-to-uplink switch-point periodicity may be used in accordance with the systems and methods disclosed herein. FIG. 19 illustrates one example of a radio frame 1935 with 5 ms switch-point periodicity. In the case of 5 ms downlink-to-uplink switch-point periodicity, each half-frame 1933 includes a standard special subframe 1931a-b. In the case of 10 ms downlink-to-uplink switch-point periodicity, a special subframe 1931 may exist in the first half-frame 1933 only.

Subframe zero (e.g., 0) 1923a and subframe five (e.g., 5) 1923f and DwPTS 1925a-b may be reserved for downlink transmission. The UpPTS 1929a-b and the subframe(s) immediately following the special subframe(s) 1931a-b (e.g., subframe two 1923c and subframe seven 1923h) may be reserved for uplink transmission. It should be noted that, in some implementations, special subframes 1931 may be considered DL subframes in order to determine a set of DL subframe associations that indicate UCI transmission uplink subframes of a UCI transmission cell.

LTE license access with TDD can have the special subframe as well as the normal subframe. The lengths of DwPTS, GP and UpPTS can be configured by using a special subframe configuration. Any one of the following ten configurations may be set as a special subframe configuration.

1) Special subframe configuration 0: DwPTS consists of 3 OFDM symbols. UpPTS consists of 1 single carrier frequency-division multiple access (SC-FDMA) symbol.

2) Special subframe configuration 1: DwPTS consists of 9 OFDM symbols for normal CP and 8 OFDM symbols for extended CP. UpPTS consists of 1 SC-FDMA symbol.

3) Special subframe configuration 2: DwPTS consists of 10 OFDM symbols for normal CP and 9 OFDM symbols for extended CP. UpPTS consists of 1 SC-FDMA symbol.

4) Special subframe configuration 3: DwPTS consists of 11 OFDM symbols for normal CP and 10 OFDM symbols for extended CP. UpPTS consists of 1 SC-FDMA symbol.

5) Special subframe configuration 4: DwPTS consists of 12 OFDM symbols for normal CP and 3 OFDM symbols for extended CP. UpPTS consists of 1 SC-FDMA symbol for normal CP and 2 SC-FDMA symbol for extended CP.

6) Special subframe configuration 5: DwPTS consists of 3 OFDM symbols for normal CP and 8 OFDM symbols for extended CP. UpPTS consists of 2 SC-FDMA symbols.

7) Special subframe configuration 6: DwPTS consists of 9 OFDM symbols. UpPTS consists of 2 SC-FDMA symbols.

8) Special subframe configuration 7: DwPTS consists of 10 OFDM symbols for normal CP and 5 OFDM symbols for extended CP. UpPTS consists of 2 SC-FDMA symbols.

9) Special subframe configuration 8: DwPTS consists of 11 OFDM symbols. UpPTS consists of 2 SC-FDMA symbols. Special subframe configuration 8 can be configured only for normal CP 10) Special subframe configuration 9: DwPTS consists of 6 OFDM symbols. UpPTS consists of 2 SC-FDMA symbols. Special subframe configuration 9 can be configured only for normal CP.

Figure 20:
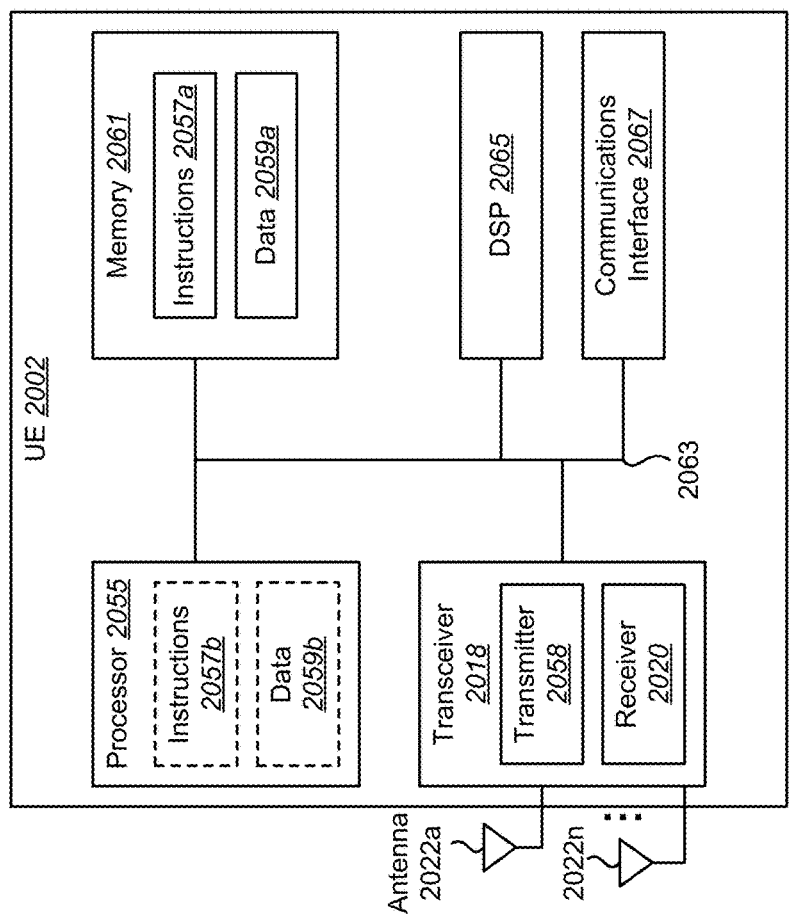
FIG. 20 illustrates various components that may be utilized in a UE.

FIG. 20 illustrates various components that may be utilized in a UE 2002. The UE 2002 described in connection with FIG. 20 may be implemented in accordance with the UE 102 described in connection with FIG. 1. The UE 2002 includes a processor 2055 that controls operation of the UE 2002. The processor 2055 may also be referred to as a central processing unit (CPU). Memory 2061, which may include read-only memory (ROM), random access memory (RAM), a combination of the two or any type of device that may store information, provides instructions 2057a and data 2059a to the processor 2055. A portion of the memory 2061 may also include non-volatile random access memory (NVRAM). Instructions 2057b and data 2059b may also reside in the processor 2055. Instructions 2057b and/or data 2059b loaded into the processor 2055 may also include instructions 2057a and/or data 2059a from memory 2061 that were loaded for execution or processing by the processor 2055. The instructions 2057b may be executed by the processor 2055 to implement one or more of the method 300, 500 and 700 described above.

The UE 2002 may also include a housing that contains one or more transmitters 2058 and one or more receivers 2020 to allow transmission and reception of data. The transmitter(s) 2058 and receiver(s) 2020 may be combined into one or more transceivers 2018. One or more antennas 2022a-n are attached to the housing and electrically coupled to the transceiver 2018.

The various components of the UE 2002 are coupled together by a bus system 2063, which may include a power bus, a control signal bus and a status signal bus, in addition to a data bus. However, for the sake of clarity, the various buses are illustrated in FIG. 20 as the bus system 2063. The UE 2002 may also include a digital signal processor (DSP) 2065 for use in processing signals. The UE 2002 may also include a communications interface 2067 that provides user access to the functions of the UE 2002. The UE 2002 illustrated in FIG. 20 is a functional block diagram rather than a listing of specific components.

Figure 21:
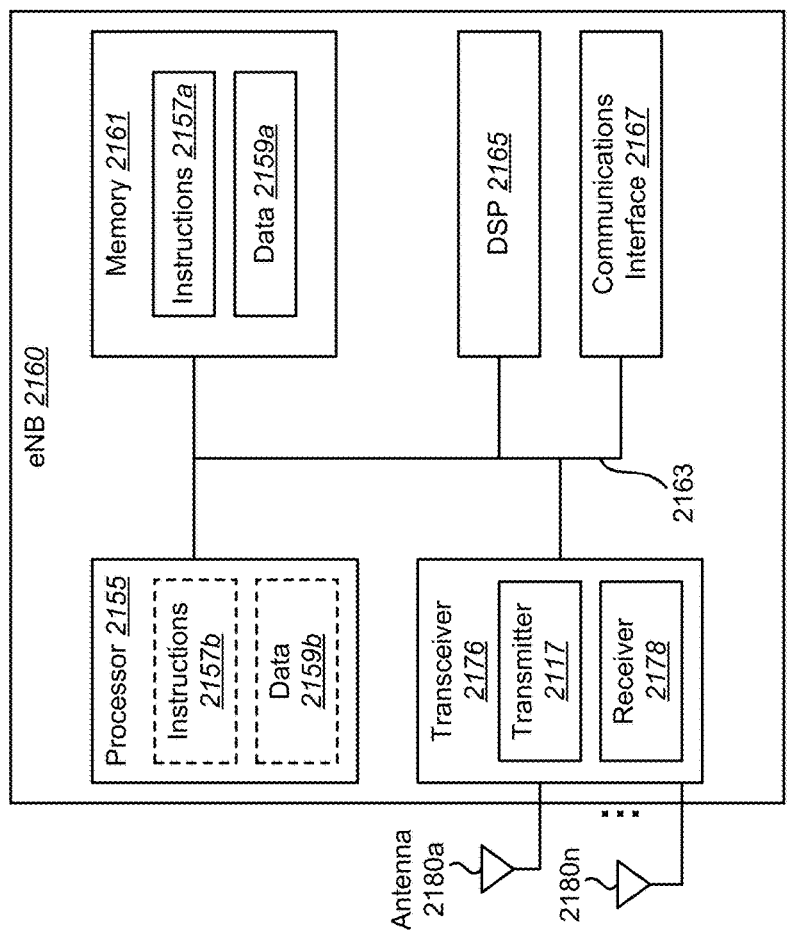
FIG. 21 illustrates various components that may be utilized in an eNB.

FIG. 21 illustrates various components that may be utilized in an eNB 2160. The eNB 2160 described in connection with FIG. 21 may be implemented in accordance with the eNB 160 described in connection with FIG. 1. The eNB 2160 includes a processor 2155 that controls operation of the eNB 2160. The processor 2155 may also be referred to as a central processing unit (CPU). Memory 2161, which may include read-only memory (ROM), random access memory (RAM), a combination of the two or any type of device that may store information, provides instructions 2157*a* and data 2159*a* to the processor 2155. A portion of the memory 2161 may also include non-volatile random access memory (NVRAM). Instructions 2157*b* and data 2159*b* may also reside in the processor 2155. Instructions 2157*b* and/or data 2159*b* loaded into the processor 2155 may also include instructions 2157*a* and/or data 2159*a* from memory 2161 that were loaded for execution or processing by the processor 2155. The instructions 2157*b* may be executed by the processor 2155 to implement one or more of the method 400, 600 and 800 described above.

The eNB 2160 may also include a housing that contains one or more transmitters 2117 and one or more receivers 2178 to allow transmission and reception of data. The transmitter(s) 2117 and receiver(s) 2178 may be combined into one or more transceivers 2176. One or more antennas 2180*a-n* are attached to the housing and electrically coupled to the transceiver 2176.

The various components of the eNB 2160 are coupled together by a bus system 2163, which may include a power bus, a control signal bus and a status signal bus, in addition to a data bus. However, for the sake of clarity, the various buses are illustrated in FIG. 21 as the bus system 2163. The eNB 2160 may also include a digital signal processor (DSP) 2165 for use in processing signals. The eNB 2160 may also include a communications interface 2167 that provides user access to the functions of the eNB 2160. The eNB 2160 illustrated in FIG. 21 is a functional block diagram rather than a listing of specific components.

Figure 22:
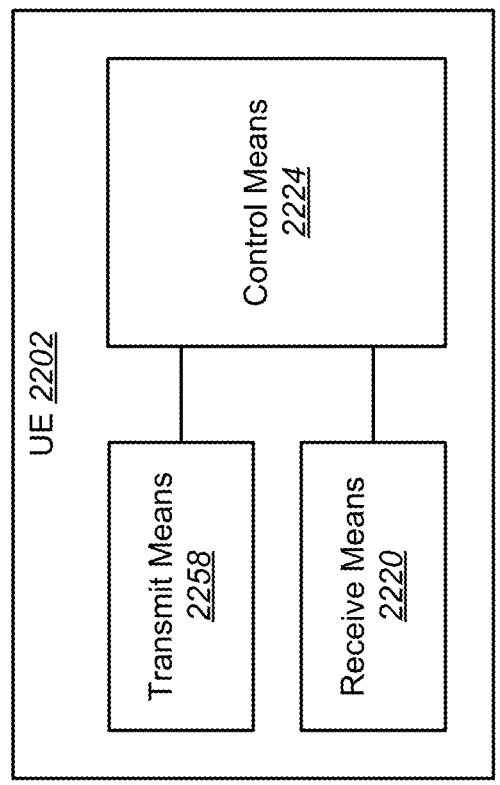
FIG. 22 is a block diagram illustrating one implementation of a UE in which systems and methods for performing LAA may be implemented.

FIG. 22 is a block diagram illustrating one implementation of a UE 2202 in which systems and methods for performing LAA may be implemented. The UE 2202 includes transmit means 2258, receive means 2220 and control means 2224. The transmit means 2258, receive means 2220 and control means 2224 may be configured to perform one or more of the functions described in connection with FIG. 1 above. FIG. 20 above illustrates one example of a concrete apparatus structure of FIG. 22. Other various structures may be implemented to realize one or more of the functions of FIG. 1. For example, a DSP may be realized by software.

Figure 23:
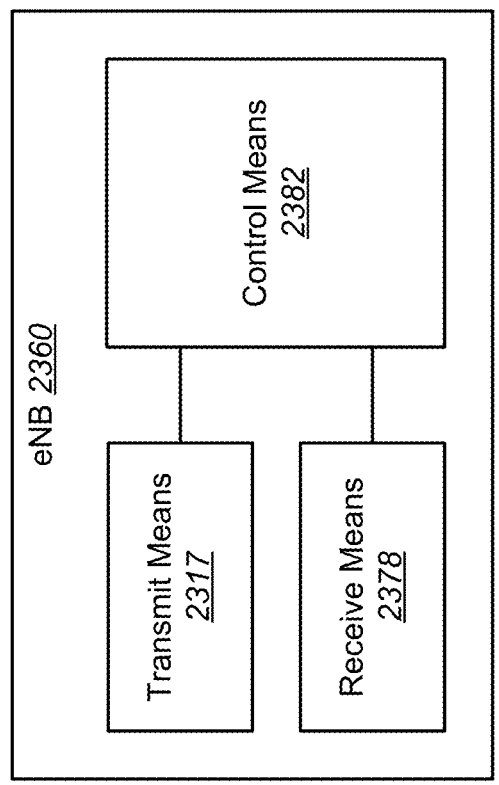
FIG. 23 is a block diagram illustrating one implementation of an eNB in which systems and methods for performing LAA may be implemented.

FIG. 23 is a block diagram illustrating one implementation of an eNB 2360 in which systems and methods for performing LAA may be implemented. The eNB 2360 includes transmit means 2317, receive means 2378 and control means 2382. The transmit means 2317, receive means 2378 and control means 2382 may be configured to perform one or more of the functions described in connection with FIG. 1 above. FIG. 21 above illustrates one example of a concrete apparatus structure of FIG. 23. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE) comprising:
 a higher layer processor configured to receive an RRC message for enhanced resource element group (EREG) configuration; and
 a physical downlink control channel receiver configured to monitor an enhanced physical downlink control channel (EPDCCH) on the basis of a first EREG structure if the EREG configuration is not established, and to monitor the EPDCCH on the basis of a second EREG structure if the EREG configuration is established;
 wherein all resource elements (REs) with number i in a physical resource block (PRB) pair comprise EREG number i, wherein i is an integer number, and wherein
 in the first EREG structure, the EREG number i is based on numbering all resource elements, except for resource elements carrying demodulation reference signal (DM-RS), in the PRB pair cyclically from an index set in an increasing order of first frequency and then time, and
 in the second EREG structure, the EREG number i is based on numbering all resource elements, except for resource elements carrying demodulation reference signal (DM-RS), on a set of consecutive OFDM symbols within the PRB pair cyclically from a subset of the index set in an increasing order of first frequency and then time.

2. The UE of claim 1, wherein:
 a single subframe comprises a first slot and a second slot in time domain,
 in the first EREG structure, each EREG includes both REs belonging to the first slot and REs belonging to the second slot, and
 in the second EREG structure, each EREG includes either the REs belonging to the first slot or the REs belonging to the second slot.

3. The UE of claim 1, wherein a single enhanced control channel element (ECCE) comprises a plurality of EREGs that have REs belonging to the same set of consecutive OFDM symbols within the PRB pair.

4. The UE of claim 3, wherein the EPDCCH comprises a plurality of ECCEs that have REs belonging to the same set of consecutive OFDM symbols within the PRB pair.

5. An evolved NodeB (eNB), comprising:
 a higher layer processor configured to send an RRC message for enhanced resource element group (EREG) configuration; and
 a physical downlink control channel transmitter configured to transmit an enhanced physical downlink control channel (EPDCCH) on the basis of a first EREG structure if the EREG configuration is not established, and to transmit the EPDCCH on the basis of a second EREG structure if the EREG configuration is established;
 wherein all resource elements (REs) with number i in a physical resource block pair (PRB pair) comprise EREG number i, wherein i is an integer number, and wherein
 in the first EREG structure, the EREG number i is based on numbering all resource elements, except for resource elements carrying demodulation reference signal (DM-RS), in the PRB pair cyclically from an index set in an increasing order of first frequency and then time, and
 in the second EREG structure, the EREG number i is based on numbering all resource elements, except for resource elements carrying demodulation reference signal (DM-RS), on a set of consecutive OFDM symbols within the PRB pair cyclically from a subset of the index set in an increasing order of first frequency, then time.

6. The eNB of claim 5, wherein:
 a single subframe comprises a first slot and a second slot in time domain,
 in the first EREG structure, each EREG includes both REs belonging to the first slot and REs belonging to the second slot, and
 in the second EREG structure, each EREG includes either the REs belonging to the first slot or the REs belonging to the second slot.

7. The eNB of claim 5, wherein a single enhanced control channel element (ECCE) comprises a plurality of EREGs that have REs belonging to the same set of consecutive OFDM symbols within the PRB pair.

8. The eNB of claim 7, wherein the EPDCCH comprises a plurality of ECCEs that have REs belonging to the same set of consecutive OFDM symbols within the PRB pair.

* * * * *

UNITED STATES PATENT AND TRADEMARK OFFICE
CERTIFICATE OF CORRECTION

PATENT NO. : 10,085,158 B2  
APPLICATION NO. : 15/152923  
DATED : September 25, 2018  
INVENTOR(S) : Toshizo Nogami et al.

It is certified that error appears in the above-identified patent and that said Letters Patent is hereby corrected as shown below:

In the Specification

In Column 9, Line 41 please delete "then Otherwise," and replace it with --then--.

Signed and Sealed this
Nineteenth Day of February, 2019

Andrei Iancu
*Director of the United States Patent and Trademark Office*